United States Patent [19]

Effler, Jr. et al.

[11] Patent Number: 5,525,679
[45] Date of Patent: Jun. 11, 1996

[54] CHLORINATED AND CHLOROSULFONATED ELASTIC SUBSTANTIALLY LINEAR OLEFIN POLYMERS

[75] Inventors: Lawrence J. Effler, Jr.; Mark T. Berard; George D. Wright, all of Baton Rouge, La.

[73] Assignee: The Dow Chemical Company, Midland, Mich.

[21] Appl. No.: 279,735

[22] Filed: Jul. 25, 1994

[51] Int. Cl.⁶ .................................................. C08F 8/22
[52] U.S. Cl. ............................. 525/334.1; 525/356
[58] Field of Search ............................. 525/334.1

[56] References Cited

U.S. PATENT DOCUMENTS

| | | | |
|---|---|---|---|
| Re. 29,350 | 8/1977 | Schoen | 526/45 |
| 4,584,351 | 4/1986 | Blanchard | 525/334.1 |
| 4,704,439 | 11/1987 | Yamaoka et al. | 525/334.1 |
| 4,708,522 | 11/1987 | Stephens et al. | 525/334.1 |
| 5,272,236 | 12/1993 | Lai et al. | 526/348.5 |

*Primary Examiner*—Bernard Lipman

[57] ABSTRACT

Chlorinated and chlorosulfonated polyethylenes are produced by chlorinating substantially linear olefin polymers having a melt flow ratio, $I_{10}/I_2$, $\geq 5.63$, a molecular weight distribution, $M_w/M_n$, defined by the equation: $M_w/M_n \leq (I_{10}/I_2)-4.63$, a critical shear rate at onset of gross melt fracture of at least 50 percent greater than the critical shear rate at the onset of surface melt fracture of a linear olefin polymer having about the same $I_2$ and Mw/Mn and at least about 0.01 long chain branches/1000 carbons and a molecular weight distribution from about 1.5 to about 2.5 and their method of manufacture are disclosed. The chlorosulfonated polyethylenes are produced by treating the chlorinated polyethylenes with a mixture of gaseous chlorine and sulfur dioxide.

24 Claims, No Drawings

CHLORINATED AND CHLOROSULFONATED ELASTIC SUBSTANTIALLY LINEAR OLEFIN POLYMERS

FIELD OF THE INVENTION

This invention relates to chlorinated and chlorosulfonated polyolefins and, particularly, polyolefins made from a new family of elastic substantially linear olefin polymers having improved processability, e.g., low susceptibility to melt fracture, even under high shear stress extrusion conditions. Processes for preparing these novel chlorinated and chlorosulfonated substantially linear olefin polymers are also disclosed and certain end-use applications are described.

BACKGROUND OF THE INVENTION

Compositions of chlorinated and chlorosulfonated polyolefins are known and have been commercially produced for many years. The properties of such materials which have good chemical and abrasion resistance and equivalent or better impact resistance have made them useful in a number of areas such as single ply roofing membranes, wire and cable jacketing, under-the-hood automotive molded parts, such as, boots and wiring, and for other thermoplastic or thermoset uses. In many situations the addition of chlorine or chlorine and sulfur has so changed the properties of the base polyolefin that new compositions have resulted which provide satisfaction in service and enhanced utility over other thermoplastic and thermoset materials. However, the final properties of the chlorinated or chlorosulfonated polyolefin polymer are determined to a large degree by the properties of the base polyolefin resin.

It has now been discovered that a new family of substantially linear olefin polymers has been provided which will offer unexpected and unpredictable properties when chlorinated or chlorosulfonated to form new compositions of such chlorinated or chlorosulfonated substantially linear olefin polymers. A number of recent patents have been issued which disclose the new substantially linear olefin polymers, such as, U.S. Pat. No. 5,272,236, issued Dec. 21, 1993, and U.S. Pat. No. 5,278,272, issued Jan. 11, 1994, both of which are incorporated herein by reference as if fully set forth.

DESCRIPTION OF THE PRIOR ART

Chlorinated linear ultra low density polyethylene produced by chlorinating a linear ultra low density polyethylene having a density in the range of from 0.860 to 0.910 g/cm$^3$ produced by copolymerizing ethylene and an alpha-olefin having 3–12 carbon atoms in the presence of a catalyst comprising a solid catalyst component containing at least magnesium, titanium and an organic aluminum compound is taught in U.S. Pat. No. 4,704,439. This product has an undesirable high level of crystallinity limiting the field of application or use and uses a conventional catalyst system. U.S. Pat. No. 4,433,105 teaches a chlorinated rubber derived from the chlorination of a copolymer rubber of ethylene/1-butene having a mol ratio of ethylene/1-butene of about 85/15 through about 95/5. If the mol ratio of 1-butene is greater than 15 or less than 5, then physical properties become poor and unacceptable. Claim 6 of U.S. Pat. No. 4,433,105 discloses that the Mw/Mn ratio of the starting copolymer of ethylene and 1-butene is less than 3. This claim is not supported in the specification so there is no way of determining what it is based on.

SUMMARY OF THE INVENTION

We have now characterized a new family of chlorinated or chlorosulfonated substantially linear olefin polymers which have many improved properties and a method of their manufacture. The new materials feature chlorinated polyolefin comprising the product produced by chlorinating a substantially linear olefin polymer characterized as having:

a) a melt flow ratio, $I_{10}/I_2$, $\geq 5.63$, b) a molecular weight distribution, Mw/Mn, defined by the equation: Mw/Mn$\leq(I_{10}/I_2)-4.63$, and c) a critical shear rate at onset of surface melt fracture of at least 50 percent greater than the critical shear rate at the onset of surface melt fracture of a linear olefin polymer having about the same $I_2$ and Mw/Mn.

The chlorinated or chlorosulfonated substantially linear olefin polymers have (1) high melt elasticity and, (2) relatively narrow molecular weight distributions with exceptionally good processability while maintaining good mechanical and chemical properties and (3) different halogenated properties compared to chlorinated and chlorosulfonated products from previously available polyethylenes. These properties are obtained without benefit of specific processing additives.

Another aspect of this invention is a polyvinyl chloride composition comprising 100 parts by weight of polyvinyl chloride and at least 2 parts by weight of a chlorinated polyolefin having a chlorine content of from about 10 to about 48% by weight said chlorinated polyethylene produced by chlorinating a substantially linear olefin polymer characterized as having:

a) a melt flow ratio, $I_{10}/I_2$ $\geq 5.63$, b) a molecular weight distribution, Mw/Mn, defined by the equation: Mw/Mn$\leq(I_{10}/I_2)-4.63$, and c) a critical shear rate at onset of surface melt fracture of at least 50 percent greater than the critical shear rate at the onset of surface melt fracture of a linear olefin polymer having about the same $I_2$ and Mw/Mn.

The substantially linear olefin polymers also include copolymers of ethylene homopolymers or an interpolymer of ethylene with at least one $C_3$–$C_{20}$ α-olefin.

DETAILED DESCRIPTION OF THE INVENTION

Substantially linear polyolefin polymers used as the base polyolefin resin in the invention have the following novel properties:

a) a melt flow ratio, $I_{10}/I_2 \geq 5.63$, b) a molecular weight distribution, $M_w/M_n$, defined by the equation:

$$M_w/M_n \leq (I_{10}/I_2)\ 4.63, \text{ and}$$

c) a critical shear rate at onset of surface melt fracture of at least 50 percent greater than the critical shear rate at the onset of surface melt fracture of a linear olefin polymer having about the same $I_2$ and Mw/Mn.

Other properties of the substantially linear polymers include:

d) a density from about 0.85 grams/cubic centimeter (g/cc) to about 0.97 g/cc (tested in accordance with ASTM D-792), and e) a melt index, MI, from about 0.01 grams/10 minutes to about 1000 grams/10 minutes.

Preferably the melt flow ratio, $I_{10}/I_2$, is from about 7 to about 20.

The molecular weight distribution (i.e., $M_w/M_n$) is preferably less than about 5, especially less than about 3.5, and most preferably from about 1.5 to about 2.5.

Throughout this disclosure, "melt index" or "$I_2$" is measured in accordance with ASTM D-1238 (190/2.16); "$I_{10}$" is measured in accordance with ASTM D-1238 (190/10).

The melt tension of these new substantially linear polyolefin polymers is also surprisingly good, e.g., as high as about 2 grams or more, especially for polymers which have a very narrow molecular weight distribution (i.e., $M_w/M_n$ from about 1.5 to about 2.5).

The substantially linear polyolefin polymers which are useful in the present invention can be homopolymers of $C_2$–$C_{20}$ olefins, such as ethylene, propylene, 4-methyl-1-pentene, etc., or they can be interpolymers of ethylene with at least one $C_3$–$C_{20}$ α-olefin and/or $C_2$–$C_{20}$ acetylenically unsaturated monomer and/or $C_4$–$C_{18}$ diolefins. The substantially linear polymers useful in the present invention can also be interpolymers of ethylene with at least one of the above $C_3$–$C_{20}$ α-olefins, diolefins and/or acetylenically unsaturated monomers in combination with other unsaturated monomers.

Monomers usefully polymerized include, for example, ethylenically unsaturated monomers, acetylenic compounds, conjugated or nonconjugated dienes, polyenes, carbon monoxide, etc. Preferred monomers include the $C_2$–$C_{10}$ α-olefins especially ethylene, 1-propene, isobutylene, 1-butene, 1-hexene, 4-methyl-1-pentene, and 1-octene. Other preferred monomers include styrene, halo- or alkyl substituted styrenes, tetrafluoroethylene, vinylbenzocyclobutane, 1,4-hexadiene, and naphthenics (e.g., cyclo-pentene, cyclohexene and cyclo-octene).

The term "substantially linear" polymers means that the polymer backbone is substituted with up to 3 long chain branches/1000 carbons. Preferred polymers are substituted with about 0.01 long chain branches/1000 carbons to about 3 long chain branches/1000 carbons, more preferably from about 0.01 long chain branches/1000 carbons to about 1 long chain branches/1000 carbons, and especially from about 0.3 long chain branches/1000 carbons to about 1 long chain branches/1000 carbons. The term "linear olefin polymers" means that the olefin polymer does not have long chain branching. That is, the linear olefin polymer has an absence of long chain branching, as for example the traditional linear low density polyethylene polymers or linear high density polyethylene polymers made using Ziegler-polymerization processes (e.g., U.S. Pat. No. 4,076,698 or U.S. Pat. No. 3,645,992, the disclosures of which are incorporated herein by reference). The term "linear olefin polymers" does not refer to high pressure branched polyethylene, ethylene/vinyl acetate copolymers, or ethylene/vinyl alcohol copolymers which are known to those skilled in the art to have numerous long chain branches.

Long chain branching is defined herein as a chain length of at least about 6 carbons, above which the length cannot be distinguished using $^{13}C$ nuclear magnetic resonance spectroscopy. The long chain branch can be as long as about the same length as the length of the polymer back-bone.

Long chain branching is determined by using $^{13}C$ nuclear magnetic resonance (NMR) spectroscopy and is quantified using the method of Randall (*Rev. Macromol. Chem. Phys.*, C29 (2&3), p. 285–297), the disclosure of which is incorporated herein by reference.

"Melt tension" is measured by a specially designed pulley transducer in conjunction with the melt indexer. Melt tension is the load that the extrudate or filament exerts while passing over the pulley at the standard speed of 30 rpm. The melt tension measurement is similar to the "Melt Tension Tester" made by Toyoseiki and is described by John Dealy in "Rheometers for Molten Plastics", published by Van Nostrand Reinhold Co. (1982) on page 250–251.

The SCBDI (Short Chain Branch Distribution Index) or CDBI (Composition Distribution Branch Index) is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), or in U.S. Pat. No. 4,798,081, both disclosures of which are incorporated herein by reference. The SCBDI or CDBI for the new polymers useful in the present invention is preferably greater than about 30 percent, especially greater than about 50 percent.

A unique characteristic of the substantially linear polyolefin polymers is a highly unexpected flow property where the $I_{10}/I_2$ value is essentially independent of polydispersity index (i.e. $M_w/M_n$). This is contrasted with conventional polyethylene resins having rheological properties such that as the polydispersity index increases, the $I_{10}/I_2$ value also increases.

The density of the ethylene or ethylene/α-olefin substantially linear olefin polymers in the present invention is measured in accordance with ASTM D-792 and is generally from about 0.85 g/cm$^3$ to about 0.97 g.cm$^3$, preferably from about 0.85g/cm$^3$ to about 0.9 g/cm$^3$ and especially from about 0.85 g/cm$^3$ to about 0.88 g/cm$^3$.

The molecular weight of the ethylene or ethylene/α-olefin substantially linear olefin polymers useful in the present invention is conveniently indicated using a melt index measurement according to ASTM D-1238. Condition 190° C./2.16 kg(formally known as "Condition E" and also known as $I_2$). Melt index is inversely proportional to the molecular weight of the polymer. Thus, the higher the molecular weight, the lower the melt index, although the relationship is not linear. The melt index for the ethylene or ethylene/α-olefin substantially linear polymers used herein is generally from about 0.01 grams/10 minutes (g/10 min) to about 1000 g/10min, preferably from about 0.01 g/10 min to about 100 g/10 min, and especially from about 0.01 g/10 min o about 10g/10 min.

Additives such as antioxidants (e.g., hindered phenolics (e.g., Irganox® 1010), phosphites (e.g., Irgafos® 168), cling additives (e.g., PIB), antiblock additives, pigments and the like can also be included in the polyethylene compositions, to the extent that they do not interfere with the enhanced properties discovered by Applicants.

The compositions comprising the substantially linear olefin polymers are formed by any convenient method, including dry blending the individual components and subsequently melt mixing, either directly in the extruder used to make the finished article (e.g., film), or by premelt mixing in a separate extruder. The polyethylene compositions may also be prepared by multiple reactor polymerization techniques. For example, one reactor may polymerize the constrained geometry catalyzed polyethylene and another reactor polymerize the heterogeneous catalyzed polyethylene, either in series or in parallel operation.

The improved melt elasticity and processability of the substantially linear polymers result, it is believed, from their method of production. The polymers may be produced via a continuous controlled polymerization process using at least one reactor, but can also be produced using multiple reactors (e.g., using a multiple reactor configuration as described in U.S. Pat. No. 3,914,342, incorporated herein by reference) at a polymerization temperature and pressure sufficient to produce the interpolymers having the desired properties. According to one embodiment of the described process, the polymers are produced in a continuous process, as opposed to a batch process. Preferably, the polymerization temperature is from about 20° C. to about 250° C., using constrained geometry catalyst technology. If a narrow molecular weight distribution polymer ($M_w/M_n$ of from about 1.5 to about 2.5) having a higher $I_{10}/I_2$ ratio (e.g. $I_{10}/I_2$ of about 7 or more, preferably at least about 8, especially at least about 9) is desired, the ethylene concentration in the reactor is preferably not more than about 8 percent by weight of the reactor contents, especially not more than about 4 percent by weight of the reactor contents. Preferably, the polymerization is performed in a solution polymerization process. Generally, manipulation of $I_{10}/I_2$ while holding $M_w/M_n$ relatively low for producing the novel substantially linear polyolefin polymers described herein is a function of reactor temperature and/or ethylene concentration. Reduced ethylene concentration and higher temperature generally produces higher $I_{10}/I_2$.

The substantially linear polyolefin polymers are analyzed by gel permeation chromatography (GPC) on a Waters 150° C. high temperature chromatographic unit equipped with three linear mixed bed columns (Polymer Laboratories (10 micron particle size)), operating at a system temperature of 140° C. The solvent is 1,2,4-trichlorobenzene, from which about 0.5% by weight solutions of the samples are prepared for injection. The flow rate is 1.0 milliliter/minute and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science*, Polymer Letters, Vol. 6, (621) 1968, incorporated herein by reference) to derive the equation:

$$M_{polyethylene} = (a)(M_{polystyrene})^b$$

In this equation, a=0.4316 and b=1.0. Weight average molecular weight, $M_w$, is calculated in the usual manner according to the formula:

$$M_w = (R)(w_i)(M_i)$$

where $w_i$ and $M_i$ are the weight fraction and molecular weight respectively of the fraction eluting from the GPC column.

The "rheological processing index" (PI) is measured by a gas extrusion rheometer (GER). The GER is described by M. Shida, R. N. Shroff and L. V. Cancio in *Polymer Engineering Science*, Vol. 17, no. 11, p. 770 (1977), and in "Rheometers for Molten Plastics" by John Dealy, published by Van Nostrand Reinhold Co. (1982) on page 97–99, both publications of which are incorporated by reference herein in their entirety. All GER experiments are performed at a temperature of 190° C., at nitrogen pressures of 2500 psig using a 0.0296 inch diameter, 20:1 L/D die having an entrance angle of 180°. The GER processing index is calculated in millipoise units from the following equation:

$$PI = 2.15 \times 10^6 \text{ dynes/cm}^2/(1000 \times \text{shear rate})$$

Where: $2.15 \times 10^6$ dynes/cm$^2$ is the shear stress at 2500 psi, and the shear rate is the shear rate at the wall as represented by the following equation:

$$32Q'/(60 \text{ sec/min})(0.745)(\text{Diameter} \times 2.54 \text{ cm/in})^3,$$

where:

Q' is the extrusion rate (gms/min), 0.745 is the melt density of polyethylene (gm/cm$^3$), and Diameter is the orifice diameter of the capillary (inches).

The PI is less than or equal to 70 percent of that of a comparative linear olefin polymer at about the same $I_2$ and Mw/Mn.

An apparent shear stress vs. apparent shear rate plot is used to identify the melt fracture phenomena. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture is characterized as the beginning of losing extrudate gloss at which the surface roughness of extrudate can only be detected by 40× magnification. The critical shear rate at onset of surface melt fracture for the substantially linear olefin polymers is at least 50 percent greater than the critical shear rate at the onset of surface melt fracture of a linear olefin polymer having about the same $I_2$ and Mw/Mn. Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER. Suitable catalysts for use herein preferably include constrained geometry catalysts, one species of which are also known as bridged monocyclopentadienyl metal catalysts. Examples of such catalysts and methods for their preparation are disclosed in U.S. application Ser. No. 545,403, filed Jul. 3, 1990 (EP-A-416, 815); U.S. application Ser. No. 547,718, filed Jul. 3, 1990 (EP-A-468,651); U.S. application Ser. No. 702,475, filed May 20, 1991 (EP-A-514,828); U.S. application Ser. No. 876,268, filed May 1, 1992, (EP-A-520,732), U.S. application Ser. No. 8,003, filed Jan. 21, 1993, (WO-93-19104), and U.S. application Ser. No. 08/241,523, filed May 13, 1994, as well as U.S. Pat. Nos.: 5,055,438, 5,057,475, 5,064,802, 5,096,867 and 5,132,380, all of which are incorporated herein by reference.

The foregoing catalysts may be further described as comprising a metal coordination complex, CG, comprising a metal, M, of Groups 3–10 or the Lanthanide series of the Periodic Table of the Elements and a delocalized n-bonded moiety substituted with a constrain-inducing moiety, said complex having a constrained geometry about the metal atom, and provided further that for such complexes comprising more than one delocalized, substituted II-bonded moiety, only one thereof for each metal atom of the complex is a cyclic, delocalized, substituted II-bonded moiety. The catalyst further comprises an activating cocatalyst.

By the term "constrained geometry" as used herein is meant that the metal atom in the metal coordination complex and also in the resulting catalyst is forced to greater exposure of the active catalyst site because one or more substituents on the delocalized II-bonded moiety forms a portion of a ring structure including the metal atom, wherein the metal is both bonded to an adjacent covalent moiety and held in association with the delocalized II-bonded group through an η5 or other II-bonding interaction. It is understood that each respective bond between the metal atom and the constituent atoms of the II-bonded moiety need not be equivalent. That is, the metal may be symmetrically or unsymmetrically II-bound thereto.

All reference to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering Groups.

Examples of delocalized II-bonded moieties include Cp* as defined hereinafter, as well as delocalized allyl or diene groups. Examples of constrain-inducing moieties include —Z— or —Z-Y— as defined hereinafter, as well as difunctional hydrocarbyl or silyl groups, mixtures thereof, and mixtures of the foregoing with a neutral two electron donor ligand selected from the group consisting of OR* SR* NR*$_2$ or PR*$_2$, wherein R* is as defined hereinafter. Preferred metals are the Group 4 metals with titanium being most preferred.

It should be noted that when the constrain-inducing moiety comprises a neutral two electron donor ligand, the bond between it and M is a coordinate-covalent bond. Also, it should be noted that the complex may exist as a dimer or higher oligomer. A neutral Lewis base, such as an ether or amine compound, may also be associated with the complex, if desired, however, such is generally not preferred.

More particularly, preferred metal coordination complexes correspond to the formula:

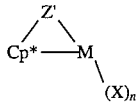

wherein:

M is a metal of Group 3–10, or the Lanthanide series of the Periodic Table of the Elements, especially a Group 4 metal, particularly titanium;

Cp* is a cyclopentadienyl group bound in an η5 bonding mode to M or such a cyclopentadienyl group substituted with from one to four substituents selected from the group consisting of hydrocarbyl, silyl, germyl, halo, hydrocarbyloxy, amine, and mixtures thereof, said substituent having up to 20 nonhydrogen atoms, or optionally, two substituents together cause Cp* to have a fused ring structure;

Z' is a divalent moiety other than a cyclopentadienyl or substituted cyclopentadienyl group, said Z' comprising boron, or a member of Group 14 of the Periodic Table of the Elements, and optionally nitrogen, phosphorus, sulfur or oxygen, said moiety having up to 20 non-hydrogen atoms, and optionally Cp* and Z' together form a fused ring system;

X independently each occurrence is an anionic ligand group (other than a cyclopentadienyl or substituted cyclopentadienyl group) having up to 50 non-hydrogen atoms; and n is 0, 1, 2, 3, or 4 depending on the valence of M.

In consonance with the previous explanation, M is preferably a Group 4 metal, especially titanium; n is 1 or 2; and X is monovalent ligand group of up to 30 nonhydrogen atoms, more preferably, C$_{1-20}$ hydrocarbyl.

By the term "substituted cyclopentadienyl" is specifically included indenyl, tetrahydroindenyl, fluorenyl, and octahydrofluorenyl groups.

More preferably still, such metal coordination complexes correspond to the formula:

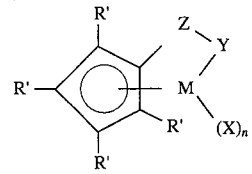

wherein R' each occurrence is independently selected from the group consisting of hydrogen, alkyl, aryl, silyl, germyl, cyano, halo and combinations thereof having up to 20 non-hydrogen atoms, or two R' groups together form a divalent derivative thereof;

X each occurrence independently is selected from the group consisting of hydride, halo, alkyl, aryl, silyl, germyl, aryloxy, alkoxy, amide, siloxy, and combinations thereof having up to 20 non-hydrogen atoms;

Y is a divalent anionic ligand group comprising nitrogen, phosphorus, oxygen or sulfur and having up to 20 non-hydrogen atoms, said Y being bonded to Z and M through said nitrogen, phosphorus, oxygen or sulfur, and optionally Y and Z together form a fused ring system;

M is a Group 4 metal, especially titanium;

Z is SIR*$_2$, CR*$_2$, SiR*$_2$SiR*$_2$, CR*$_2$CR*$_2$, CR*=CR*, CR*$_2$SiR*$_2$, GeR*$_2$, BR*, or BR*$_2$; wherein:

R* each occurrence is independently selected from the group consisting of hydrogen, alkyl, aryl, silyl, halogenated alkyl, halogenated aryl groups having up to 20 non-hydrogen atoms, and mixtures thereof, or two or more R* groups from Z, or an R* group from Z together with Y form a fused ring system; and n is 1 or 2.

Further more preferably, Y is —O—, —S—, —NR*—, —PR*—. Highly preferably Y is a nitrogen or phosphorus containing group corresponding to the formula —N(R')— or —P(R')—, wherein R' is as previously described, i.e. Y is an amido or phosphido group.

Most highly preferred metal coordination complexes correspond to the formula:

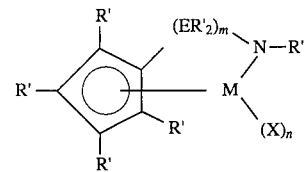

wherein:

M is titanium bound in an η5 bonding mode to the cyclopentadienyl group;

R' each occurrence is independently selected from the group consisting of hydrogen, silyl, alkyl, aryl and combinations thereof having up to 10 carbon or silicon atoms, or two R' groups together form a divalent derivative thereof;

E is silicon or carbon;

X independently each occurrence is hydride, halo, alkyl, aryl, aryloxy or alkoxy of up to 10 carbons;

m is 1 or 2; and n is 1 or 2.

Examples of the above most highly preferred metal coordination compounds include compounds wherein the R' on the amido group is methyl, ethyl, propyl, butyl, pentyl, hexyl, (including isomers), norbornyl, benzyl, phenyl, etc.; the cyclopentadienyl group is cyclopentadienyl, indenyl, tetrahydroindenyl, fluorenyl, octahydrofluorenyl, etc.; R' on the foregoing cyclopentadienyl groups each occurrence is hydrogen, methyl, ethyl, propyl, butyl, pentyl, hexyl, (including isomers), norbornyl, benzyl, phenyl, etc.; and X is chloro, bromo, iodo, methyl, ethyl, propyl, butyl, pentyl, hexyl, (including isomers), norbornyl, benzyl, phenyl, etc.

Specific highly preferred compounds include: (tert-butylamido)(tetramethyl-η15-cyclopentadienyl)-1,2-ethanediyltitanium dimethyl, (tert-butylamido) (tetra-methyl-η5-cyclopentadienyl)-1,2-ethanediyltitanium dibenzyl, (tert-butylamido) (tetramethyl-η5-cyclopentadienyl)dimethylsilanetitanium dimethyl, (tert-butylamido)(tetramethyl-η5cyclopentadienyl)dimethylsilanetitanium dibenzyl, (methylamido)(tetramethyl-η5-cyclopentadienyl)dimethylsilanetitanium dimethyl, (methylamido)(tetramethyl-η5-cyclopentadienyl)dimethylsilanetitanium dibenzyl, (phenylamido)(tetramethyl-η5-cyclopentadienyl)dimethylsilanetitanium dimethyl, (phenylamido)(tetramethyl-η5-cyclopentadienyl)dimethylsilanetitanium dibenzyl, (benzylamido)(tetramethyl-η5-cyclopentadienyl)dimethylsilanetitanium dimethyl, (benzylamido)(tetramethyl-η5-cyclopentadienyl)dimethylsilanetitanium dibenzyl, (tert-butylamido)(η5-cyclopentadienyl)-1,2-ethanediyltitanium dimethyl, (tert-butylamido)(η5-cyclopentadienyl)-1,2-ethanediyltitanium dibenzyl, (tert-butylamido)(η5-cyclopentadienyl)dimethylsilanetitanium dimethyl, (tert-butylamido) (η5-cyclopentadienyl)dimethylsilanetitanium dibenzyl, (methylamido) (η5-cyclopentadienyl)dimethylsilanetitanium dimethyl, (t-butylamido) (η5-cyclopentadienyl) dimethylsilanetitanium dibenzyl, (t-butylamido) indenyldimethyl silanetitanium dimethyl, (t-butylamido)indenyldimethylsilanetitanium dibenzyl, (benzylamido)indenyldimethylsilanetitanium dibenzyl; and the corresponding zirconium or hafnium coordination complexes.

The complexes may be prepared by contacting a metal reactant of the formula: MXn(X')₂ wherein M, X, and n are as previously defined, and X' is a suitable leaving group, especially halo, with a double Group I metal derivative or double Grignard derivative of a compound which is a combination of the delocalized II-bonding group having the constrain-inducing moiety attached thereto, i.e., L-Cp-Z-L, wherein L is a Group I metal or Grignard. The reaction is conducted in a suitable solvent and the salt or other byproduct is separated. Suitable solvents for use in preparing the metal complexes are aliphatic or aromatic liquids such as cyclohexane, methylcyclohexane, pentane, hexane, heptane, tetrahydrofuran, diethyl ether, benzene, toluene, xylene, ethylbenzene, etc., or mixtures thereof.

In a preferred method of preparation, a metal compound in a lower oxidation state than in the desired final complex is employed in a process otherwise the same as previously described. A noninterfering oxidizing agent, preferably an organic halide, is thereafter employed to raise the oxidation state of the metal to the desired value. The oxidation is accomplished merely by contacting the reactants, utilizing solvents and reaction conditions used in the preparation of the complex itself. By the term "noninterfering oxidizing agent" is meant a compound having an oxidation potential sufficient to raise the metal oxidation state without interfering with the desired complex formation or subsequent polymerization processes. A particularly suitable noninterfering oxidizing agent is AgCl or an organic halide such as methylene chloride. The foregoing techniques are disclosed in U.S. Serial Nos.: 545,403, filed Jul. 3, 1990, 642,111, filed Jan. 16, 1991, now U.S. Pat. No. 5,189,192, and 967,365, filed Oct. 28, 1992, the teachings of all of which are incorporated herein by reference.

As previously mentioned, the complexes are rendered catalytically active by combination with an activating cocatalyst. Suitable cocatalysts for use herein include polymeric or oligomeric alumoxanes, especially methylalumoxane, as well as nonpolymeric, inert, compatible, noncoordinating, ion forming, compounds. Preferred cocatalysts are inert, noncoordinating, ion forming, boron compounds.

Ionic, active catalyst species, i.e. the catalysts resulting from the combination of the metal coordination complexes and an ion forming cocatalyst, preferably correspond to the formula:

wherein:

CG' is a cationic derivative of the previously defined metal coordination complex;

A$^{d-}$ is a noncoordinating, compatible anion having a charge of d, and d is an integer from 1 to 3.

Preferred ionic catalysts correspond to the formula:

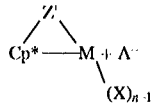

wherein:

Cp*, Z', M, X, and n are as defined with respect to previous formula I, and

A⁻ is a monovalent, noncoordinating, compatible anion.

More highly preferred ionic catalysts correspond to the formula:

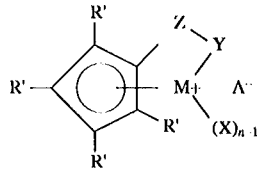

wherein:

R', Z, Y, M, X, and n are as defined with respect to previous formula II, and

A⁻ is a monovalent, noncoordinating, compatible anion.

Most highly preferred ionic catalysts correspond to the formula:

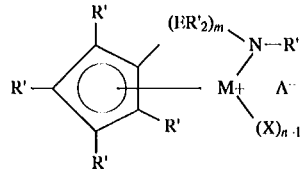

wherein:

R', E, M, X, m and n are as defined with respect to previous formula III, and

A⁻ is a monovalent, noncoordinating, compatible anion.

One method of making these ionic catalysts involves combining:

a₁) the previously disclosed metal coordination complex containing at least one substituent which will combine with the cation of a second component, and b₁) at least one second component which is a salt of a Bronsted acid and a noncoordinating, compatible anion.

More particularly the noncoordinating, compatible anion of the Bronsted acid salt may comprise a single, nonnucleophilic, coordination complex comprising a charge-bearing metal or nonmetal core. Preferred anions comprise aluminum, silicon, boron, or phosphorus.

Preferred metal complexes for the foregoing reaction are those containing at least one hydride, hydrocarbyl or substituted hydrocarbyl group. The reaction is conducted in an inert liquid such as tetrahydrofuran, $C_{5-10}$ alkanes, or toluene.

Compounds useful as a second component in the foregoing preparation of the ionic catalysts in step b1) will comprise a cation, which is a Bronsted acid capable of donating a proton, and the anion $A^-$. Preferred anions are those containing a single coordination complex comprising a negative charge bearing core which anion is capable of stabilizing the active catalyst species (the metal cation) which is formed when the two components are combined. Also, said anion should be sufficiently labile to be displaced by olefinic, diolefinic and acetylenically unsaturated compounds or other neutral Lewis bases such as ethers, nitriles and the like. Compounds containing anions which comprise coordination complexes containing a single core atom are, of course, well known and many, particularly such compounds containing a single boron atom in the anion portion, are available commercially. In light of this, salts containing anions comprising a coordination complex containing a single boron atom are preferred.

The second component useful in this preparation of the ionic catalysts used in this invention may be represented by the following general formula:

$$(L-H)_d^+ [A]^{d-} \qquad \text{VII}$$

wherein:
L is a neutral Lewis base;
$(L-H)^+$ is a Bronsted acid; and
$A^{d-}$ is as previously defined.
More preferably $A^{d-}$ corresponds to the formula:

$$[M'_m + Q_n]^{d-}$$

wherein:
m is an integer from 1 to 7;
n is an integer from 2 to 8;
n−m=d;
M' is an atom selected from Groups 5–13 of the Periodic Table of the Elements; and
Q independently each occurrence is selected from the Group consisting of hydride, dialkylamido, halide, alkoxide, aryloxide, hydrocarbyl, and substituted-hydrocarbyl radicals of up to 20 carbons with the proviso that in not more than one occurrence is Q halide.

Second components comprising boron which are particularly useful in the preparation of catalysts of use in this invention may be represented by the following general formula:

$$[L-H]^+[BQ_4]^-$$

wherein:
L is a neutral Lewis base;
$[L-H]^+$ is a Bronsted acid;
B is boron in a valence state of 3; and
Q is a $C_{1-20}$ fluorinated hydrocarbyl group. Most preferably, Q is each occurrence a perfluorinated aryl group, especially, tetrakispentafluorophenylborate.

Illustrative, but not limiting, examples of boron compounds which may be used as a second component in the preparation of the improved catalysts of this invention are trialkyl ammonium salts or triaryl ammonium salts such as: trimethylammonium tetraphenylborate, N,N-dimethylanilinium tetraphenylborate, trimethylammonium tetrakisperfluorophenylborate, triethylammonium tetrakisperfluorophenylborate, tripropylammonium tetrakisperfluorophenylborate, tri(n-butyl)ammonium tetrakisperfluorophenylborate, tri(t-butyl)ammonium tetrakisperfluorophenylborate, N,N-dimethylanilinium tetrakisperfluorophenylborate, N,N-diethylanilinium tetrakisperfluorophenylborate, N,N-(2,4,6-pentamethyl)anilinium tetrakisperfluorophenylborate, trimethylammonium tetrakis-(2,3,4,6-tetrafluorophenylborate, N,N-dimethylanilinium tetrakis-(2,3,4,6tetrafluorophenylborate, N,N-(2,4,6-pentamethyl)anilinium tetrakis-(2,3,4,6-tetrafluorophenylborate, and the like; dialkyl ammonium salts such as di-(i-propyl)ammonium tetrakis-pentafluorophenylborate, dicyclohexylammonium tetrakis-pentafluorophenylborate and the like; and triaryl substituted phosphonium salts such as triphenylphosphonium tetrakispentafluorophenylborate, tri(o-tolyl) phosphonium tetrakis-pentafluorophenylborate, tri(2,6-dimethylphenyl)phosphonium tetrakispentafluorophenylborate, and the like.

Another technique for preparing the ionic complexes involves combining:
a₂) the previously disclosed metal coordination complex (first component); and
b₂) at least one second component which is a salt of a carbenium and the previously disclosed noncoordinating, compatible anion, $A^-$.

Another technique for preparing the ionic complexes involves combining:
a₃) a reduced metal derivative of the desired metal coordination complex wherein the metal is in an oxidation state one less than that of the metal in the finished complex; and
b₃) at least one second component which is a salt of a cationic oxidizing agent and a noncoordinating, compatible anion.

The second component useful in this preparation of the ionic catalyst used in this invention may be represented by the following general formula:

$$(Ox^{e+})_d(A^{d-})_e \qquad \text{VIII}$$

wherein:;
$Ox^{e+}$ is a cationic oxidizing agent having a charge of +e; and
$A^{d-}$ is as previously defined.

Preferred cationic oxidizing agents include: ferrocenium, bisindenyl Fe(III), cationic derivatives of substituted ferrocenium, $Ag^+$, $Pd^{+2}$, $Pt^{+2}$, $Hg^{+2}$, $Hg2^{+2}$, $A_u+$, or $C_u+$. Preferred embodiments of $A^{d-}$ are those anions previously defined, especially, tetrakisperfluorophenylborate.

A still further technique for preparing the ionic complexes involves combining:
a₄) a reduced metal derivative of the desired metal coordination complex wherein the metal is in an oxidation state one less than that of the metal in the finished complex; and b$_4$) at least one second component which is a neutral oxidizing agent in combination with a Lewis acid mitigating agent. Suitable oxidizing agents are quinine compounds, especially bisquinones. Suitable Lewis acid mitigating agents include trisperfluorophenylborane. This technique is more fully disclosed in U.S. application Ser. No. 08/34,434, filed Mar. 19, 1993, the teachings of which are herein incorporated by reference.

A final technique for preparing the ionic complexes is an abstraction technique involving combining:

a$_5$) the previously disclosed metal coordination complex (first component); and b$_5$) a Lewis acid having sufficient Lewis acidity to cause abstraction of an anionic ligand of the metal coordination complex thereby forming a cationic derivative thereof.

Preferred metal coordination complexes for the foregoing abstraction reaction are those containing at least one hydride, hydrocarbyl or substituted hydrocarbyl group able to be abstracted by the Lewis acid. A preferred Lewis acid is tris(perfluorophenyl)borane. This technique is more fully disclosed in the previously mentioned U.S. application Ser. No. 876,268, filed May 1, 1992, (EP-A-520,732) the teachings of which were incorporated by reference.

Ionic complexes resulting from the latter abstraction technique have a limiting charge separated structure corresponding to the formula:

IX wherein:

CG' is the derivative formed by abstraction of an X group from the metal complex, which is as previously defined in it broadest, preferred and most preferred embodiments;

X is the anionic ligand abstracted from the metal coordination complex; and

L is the remnant of the Lewis acid. Preferably X is $C_1$–$C_{10}$ hydrocarbyl, most preferably methyl.

The preceding formula is referred to as the limiting, charge separated structure. However, it is to be understood that, particularly in solid form, the catalyst may not be fully charge separated. That is, the X group may retain a partial covalent bond to the metal atom, M. Thus, the catalysts may be alternately depicted as possessing the formula:

wherein CG" is the partially charge separated CG group.

Other catalysts which are useful as the catalyst compositions for preparation of polymers useful in this invention, especially compounds containing other Group 4 metals, will, of course, be apparent to those skilled in the art.

Polymerization

The polymerization conditions for manufacturing the polymers of the present invention are generally those useful in the solution polymerization process, although the application of the present invention is not limited thereto. Slurry and gas phase polymerization processes are also believed to be useful, provided the proper catalyst and polymerization conditions are employed.

Multiple reactor polymerization processes are also useful in the present invention, such as those disclosed in U.S. Pat. No. 3,914,342, incorporated herein by reference. The multiple reactors can be operated in series or in parallel, with at least one constrained geometry catalyst employed in at least one of the reactors.

In general, the polymerization according to the present disclosure may be accomplished at conditions well known in the prior art for Ziegler-Natta or Kaminsky-Sinn type polymerization reactions, that is, temperatures from 0° to 250° C. and pressures from atmospheric to 1000 atmospheres (100 MPa). Suspension, solution, slurry, gas phase or other process conditions may be employed if desired. A support may be employed but preferably the catalysts are used in a homogeneous manner. It will, of course, be appreciated that the active catalyst system, especially nonionic catalysts, form in situ if the catalyst and the cocatalyst components thereof are added directly to the polymerization process and a suitable solvent or diluent, including condensed monomer, is used in said polymerization process. It is, however, preferred to form the active catalyst in a separate step in a suitable solvent prior to adding the same to the polymerization mixture.

The polymerization conditions for manufacturing the substantially linear polyolefins polymers which are useful in the present invention are generally those useful in the solution polymerization process, although the application is not limited thereto. Gas phase and slurry polymerization processes are also believed to be useful, provided the proper catalysts and polymerization conditions are employed.

All procedures were performed under an inert atmosphere of nitrogen or argon. Solvent choices were often optional, for example, in most cases either pentane or 30–60 petroleum ether can be interchanged. Amines, silanes, lithium reagents, and Grignard reagents were purchased from Aldrich Chemical Company. Published methods for preparing tetramethylcyclopentadiene ($C_5Me_4H_2$) and lithium tetramethylcyclopentadienide (Li($C_5Me_4H$)) include C. M. Fendrick et al. *Organometallics*, 3, 819 (1984). Lithiated substituted cyclopentadienyl compounds may be typically prepared from the corresponding cyclopentadiene and a lithium reagent such as n-butyl lithium. Titanium trichloride (TiCl$_3$) was purchased from Aldrich Chemical Company. The tetrahydrofuran adduct of titanium trichloride, TiCl$_3$(THF)$_3$, was prepared by refluxing TiCl$_3$ in THF overnight, cooling, and isolating the blue solid product, according to the procedure of L. E. Manzer, *Inorg. Syn.*, 21, 135 (1982).

Polyolefin Preparation

EXAMPLES 1–4

The metal complex solution for Example 1 is prepared as follows:

Part 1: Prep of Li($C_5Me_4H$)

In the drybox, a 3L 3-necked flask was charged with 18.34 g of $C_5Me_4H_2$, 800 mL of pentane, and 500 mL of ether. The flask was topped with a reflux condenser, a mechanical stirrer, and a constant addition funnel container 63 mL of 2.5 M n-BuLi in hexane. The BuLi was added dropwise over several hours. A very thick precipitate formed; approx. 1000 mL of additional pentane had to be added over the course of the reaction to allow stirring to continue. After the addition was complete, the mixture was stirred overnight. The next day, the material was filtered, and the solid was thoroughly washed with pentane and then dried under reduced pressure. 14.89 g of Li($C_5Me_4H$) was obtained (78 percent).

Part 2: Prep of $C_5Me_4HSiMe_2Cl$

In the drybox 30.0 g of Li(C$_5$Me$_4$H) was placed in a 500 mL Schlenk flask with 250 mL of THF and a large magnetic stir bar. A syringe was charged with 30 mL of Me$_2$SiCl$_2$ and the flask and syringe were removed from the drybox. On the Schlenk line under a flow of argon, the flask was cooled to −78° C., and the Me$_2$SiCl$_2$ added in one rapid addition. The reaction was allowed to slowly warm to room temperature and stirred overnight. The next morning the volatile materials were removed under reduced pressure, and the flask was taken into the drybox. The oily material was extracted with pentane, filtered, and the pentane was removed under reduced pressure to leave the C$_5$Me$_4$HSiMe$_2$Cl as a clear yellow liquid (46.83 g; 92.9 percent).

Part 3: Prep of C$_5$Me$_4$HSiMe$_2$NHtBu

In the drybox, a 3-necked 2 L flask was charged with 37.4 g of t-butylamine and 210 mL of THF. C$_5$Me$_4$HSiMe$_2$Cl (25.47 g) was slowly dripped into the solution over 3–4 hours. The solution turned cloudy and yellow. The mixture was stirred overnight and the volatile materials removed under reduced pressure. The residue was extracted with diethyl ether, the solution was filtered, and the ether removed under reduced pressure to leave the C$_5$Me$_4$HSiMe$_2$NHtBu as a clear yellow liquid (26.96 g; 90.8 percent).

Part 4: Prep of [MgCl]$_2$[Me$_4$C$_5$SiMe$_2$NtBu](THF)$_x$

In the drybox, 14.0 mL of 2.0 M isopropylmagnesium chloride in ether was syringed into a 250 mL flask. The ether was removed under reduced pressure to leave a colorless oil. 50 mL of a 4:1 (by volume) toluene:THF mixture was added followed by 3.50 g of Me$_4$HC$_5$SiMe$_2$NtHBu. The solution was heated to reflux. After refluxing for 2 days, the solution was cooled and the volatile materials removed under reduced pressure. The white solid residue was slurried in pentane and filtered to leave a white powder, which was washed with pentane and dried under reduced pressure. The white powder was identified as [MgCl]$_2$[Me$_4$C$_5$SiMe$_2$NtBu](THF)$_x$ (yield: 6.7 g).

Part 5: Prep of [C$_5$Me$_4$(SiMe$_2$NtBu)]TiCl$_2$

In the drybox, 0.50 g of TiCl$_3$ (THF)$_3$ was suspended in 10 mL of THF. 0.69 g of solid [MgCl]$_2$[Me$_4$C$_5$SiMe$_2$NtBu](THF)$_x$ was added, resulting in a color change from pale blue to deep purple. After 15 minutes, 0.35 g of AgCl was added to the solution. The color immediately began to lighten to a pale green-yellow. After 1½ hours, the THF was removed under reduced pressure to leave a yellow-green solid. Toluene (20 mL) was added, the solution was filtered, and the toluene was removed under reduced pressure to leave a yellow-green solid, 0.51 g (quantitative yield) identified by 1H NMR as [C$_5$Me$_4$(SiMe$_2$NtBu)]TiCl$_2$.

Part 6: Preparation of [C$_5$Me$_4$(SiMe$_2$NtBu)]TiMe$_2$

In an inert atmosphere glove box, 9.031 g of [C$_5$Me$_4$(Me$_2$SiNtBu)]TiCl$_2$ is charged into a 250 ml flask and dissolved into 100 ml of THF. This solution is cooled to about −25° C. by placement in the glove box freezer for 15 minutes. To the cooled solution is added 35 ml of a 1.4 M MeMgBr solution in toluene/THF (75/25). The reaction mixture is stirred for 20 to 25 minutes followed by removal of the solvent under vacuum. The resulting solid is dried under vacuum for several hours. The product is extracted with pentane (4×50 ml) and filtered. The filtrate is combined and the pentane removed under vacuum giving the catalyst as a straw yellow solid.

The metal complex, [C$_5$Me$_4$(SiMe$_2$NtBu)]TiMe$_2$, solution for Examples 2 and 3 is prepared as follows:

In an inert atmosphere glove box 10.6769 g of a tetrahydrofuran adduct of titanium trichloride, TiCl$_3$ (THF)$_3$, is loaded into a 1l flask and slurried into ~300 ml of THF. To this slurry, at room temperature, is added 17.402 g of [MgCl]$_2$ [N$^t$BuSiMe$_2$C$_5$Me$_4$] (THF)$_x$ as a solid. An additional 200 ml of THF is used to help wash this solid into the reaction flask. This addition resulted in an immediate reaction giving a deep purple solution. After stirring for 5 minutes 9.23 ml of a 1.56 M solution of CH$_2$Cl$_2$ in THF is added giving a quick color change to dark yellow. This stage of the reaction is allowed to stir for about 20 to 30 minutes. Next, 61.8 m 1 of a 1.4 M MeMgBr solution in toluene/THF(75/25) is added via syringe. After about 20 to 30 minutes stirring time the solvent is removed under vacuum and the solid dried. The product is extracted with pentane (8×50ml) and filtered. The filtrate is combined and the pentane removed under vacuum giving the metal complex as a tan solid.

The metal complex, [C$_5$Me$_4$(SiMe$_2$N$^t$Bu)]TiMe$_2$, solution for Example 4 is prepared as follows:

In an inert atmosphere glove box 4.8108 g of TiCl$_3$ (thf)$_3$ is placed in a 500 ml flask and slurried into 130 ml of THF. In a separate flask 8.000 g of [MgCl]$_2$[NtBuSiMe$_2$C$_5$Me$_4$] (THF)$_x$ is dissolved into 150 ml of THF. These flasks are removed from the glove box and attached to a vacuum line and the contents cooled to −30° C. The THF solution of [MgCl]$_2$[N$^t$BuSiMe$_2$C$_5$Me$_4$](THF)$_x$ is transferred (over a 15 minute period) via cannula to the flask containing the TiCl$_3$ (THF)$_3$ slurry. This reaction is allowed to stir for 1.5 hours over which time the temperature warmed to 0° C. and the solution color turned deep purple. The reaction mixture is cooled back to −30° C. and 4.16 ml of a 1.56 M CH$_2$Cl$_2$ solution in THF is added. This stage of the reaction is stirred for an additional 1.5 hours and the temperature warmed to −10° C. Next, the reaction mixture is again cooled to −40° C. and 27.81 ml of a 1.4 M MeMgBr solution in toluene/ THF (75/25) was added via syringe and the reaction is now allowed to warm slowly to room temperature over 3 hours. After this time the solvent is removed under vacuum and the solid dried. At this point the reaction flask is brought back into the glove box where the product is extracted with pentane (4×50 ml) and filtered. The filtrate is combined and the pentane removed under vacuum giving the catalyst as a tan solid. The metal complex is then dissolved into a mixture of C$_8$–C$_{10}$ saturated hydrocarbons (e.g., Isopar® E, made by Exxon) and ready for use in polymerization.

The polymer products of Examples 1–4 are produced in a solution polymerization process using a continuously stirred reactor. Additives (e.g., antioxidants, pigments, etc.) can be incorporated into the interpolymer products either during the pelletization step or after manufacture, with a subsequent re-extrusion. Examples 1–4 are each stabilized with 1250 ppm calcium stearate, 200 ppm Irganox® 1010, and 1600 ppm Irgafos® 168. Irgafos® 168 is a phosphite stabilizer and Irganox® 1010 is a hindered polyphenol stabilizer (e.g., tetrakis [methylene 3-(3,5-ditert.butyl-4-hydroxyphenylpropionate)]methane. Both are trademarks of and made by Ciba-Geigy Corporation.

The ethylene and the hydrogen are combined into one stream before being introduced into the diluent mixture. Typically, the diluent mixture comprises a mixture of C$_8$–C$_{10}$ saturated hydrocarbons, (e.g., Isopar® E, made by Exxon) and the comonomer(s). For Examples 1–4, the comonomer is 1-octene. The reactor feed mixture is continuously injected into the reactor. The metal complex and the cocatalyst (the cocatalyst is tris(pentafluorophenyl)borane for Examples 1–4 herein which forms the ionic catalyst in situ) are combined into a single stream and also continuously injected into the reactor. Sufficient residence time is allowed for the metal complex and cocatalyst to react to the desired extent for use in the polymerization reactions, at least about 10 seconds. For the polymerization reactions of Examples 1–4, the reactor pressure is held constant at about 490 psig. Ethylene content of the reactor, after reaching steady state, is maintained below about 8 percent.

After polymerization, the reactor exit stream is introduced into a separator where the molten polymer is separated from the unreacted comonomer(s), unreacted ethylene, unreacted hydrogen, and diluent mixture stream. The molten polymer is subsequently strand chopped or pelletized and, after being cooled in a water bath or pelletizer, the solid pellets are collected. Table I describes the polymerization conditions and the resultant polymer properties:

TABLE I

|  | Example | | | |
| --- | --- | --- | --- | --- |
|  | 1 | 2 | 3 | 4 |
| Ethylene feed rate (lbs/hour) | 3.2 | 3.8 | 3.8 | 3.8 |
| Comonomer/Olefin* ratio (mole %) | 12.3 | 0 | 0 | 0 |
| Hydrogen/Ethylene ratio (mole %) | 0.054 | 0.072 | 0.083 | 0.019 |
| Diluent/Ethylene ratio (weight basis) | 9.5 | 7.4 | 8.7 | 8.7 |
| metal complex concentration (molar) | 0.00025 | 0.0005 | 0.001 | 0.001 |
| metal complex flow rate (ml/min) | 5.9 | 1.7 | 2.4 | 4.8 |
| cocatalyst concentration (molar) | 0.001 | 0.001 | 0.002 | 0.002 |
| cocatalyst flow rate (ml/min) | 2.9 | 1.3 | 6 | 11.9 |
| Reactor temperature (°C.) | 114 | 160 | 160 | 200 |
| Ethylene Conc. in the reactor exit stream (weight percent) | 2.65 | 3.59 | 0.86 | 1.98 |
| Product $I_2$ (g/10 minutes) | 1.22 | 0.96 | 1.18 | 0.25 |
| Product density (g/cc) | 0.903 | 0.954 | 0.954 | 0.953 |
| Product $I_{10}/I_2$ | 6.5 | 7.4 | 11.8 | 16.1 |
| Product $M_w/M_n$ | 1.86 | 1.95 | 2.09 | 2.07 |

*For Examples 1–4, the Comonomer/Olefin ratio is defined as the percentage molar ratio of ((1-octene/(1-octene + ethylene))

The $^{13}C$ NMR spectrum of Example 3 (ethylene homopolymer) shows peaks which can be assigned to the $\alpha\delta+$, $\beta\delta+$, and methine carbons associated with a long chain branch. Long chain branching is determined using the method of Randall described earlier in this disclosure, wherein he states that "Detection of these resonances in high-density polyethylenes where no 1-olefins were added during the polymerization should be strongly indicative of the presence of long chain branching." Using the equation 141 from Randall (p. 292):

Branches per 10,000 carbons $=[\frac{1}{3}\alpha/T_{Tot}]\times 10^4$, wherein $\alpha$=the average intensity of a carbon from a branch ($\alpha\delta+$) carbon and $T_{Tot}$= the total carbon intensity, the number of long chain branches in this sample is determined to be 3.4 per 10,000 carbon atoms, or 0.34 long chain branches/1000 carbon atoms.

Polyolefin Examples 5, 6 and Comparative Examples 7–9

Examples 5, 6 and comparison examples 7–9 with the same melt index are tested for rheology comparison. Examples 5 and 6 are the substantially linear polyethylenes produced by the constrained geometry catalyst technology, as described in Examples 1–4. Examples 5 and 6 are stabilized as Examples 1–4.

Comparison examples 7, 8 and 9 are conventional heterogeneous Ziegler polymerization blown film resins Dowlex® 2045A, Attane® 4201, and Attane® 4403, respectively, all of which are ethylene/1-octene copolymers made by The Dow Chemical Company. Comparative Example 7 is stabilized with 200 ppm Irganox® 1010, and 1600 ppm Irgafos® 168 while comparative examples 8 and 9 are stabilized with 200 ppm Irganox® 1010 and 800 ppm PEPQ®. PEPQ® is a trademark of Sandoz Chemical, the primary ingredient of which is believed to be tetrakis-(2,4-di-tertbutyl-phenyl)-4,4' biphenylphosphonite.

A comparison of the physical properties of each example and comparative example is listed in Table II.

TABLE II

| Property | Polyolefin Example 5 | Polyolefin Example 6 | Comparison Example 7 | Comparison Example 8 | Comparison Example 9 |
| --- | --- | --- | --- | --- | --- |
| $I_2$ | 1 | 1 | 1 | 1 | 0.76 |
| density | .92 | .902 | .92 | .912 | .905 |
| $I_{10}/I_2$ | 9.45 | 7.61 | 7.8–8 | 8.2 | 8.7 |
| $M_w/M_n$ | 1.97 | 2.09 | 3.5–3.8 | 3.8 | 3.8–4.0 |

Surprisingly, even though the molecular weight distribution of Polyolefins Examples 5 and 6 is narrow (i.e., $M_w/M_n$ is low), the $I_{10}/I_2$ values are higher in comparison with comparative examples 7–9. The $I_{10}/I_2$ value for the novel substantially linear polyolefin polymers of the present description is essentially independent of the molecular weight distribution, $M_w/M_n$, which is not true for conventional Ziegler polymerized resins.

Polyolefin Example 5 and comparison example 7 with similar melt index and density (Table II) are also extruded via a Gas Extrusion Rheometer (GER) at 190° C. using a 0.0296" diameter, 20 L/D die. The processing index (P.I.) is measured at an apparent shear stress of $2.15\times 10^6$ dyne/cm$^2$ as described previously. A comparison of the shear stresses and corresponding shear rates before the onset of gross melt fracture is listed in Table III. It is particularly interesting that the PI of Polyolefin Example 5 is more than 20% lower than the PI of Comparative Example 7 and that the onset of melt fracture or sharkskin for Polyolefin Example 5 is also at a significantly higher shear stress and shear rate in comparison with the Comparative Example 7. Furthermore, the Melt Tension (MT) as well as Elastic Modulus of Example 5 are higher than that of Comparative Example 7.

TABLE III

| Property | Polyolefin Example 5 | Comparison example 7 |
| --- | --- | --- |
| $I_2$ | 1 | 1 |
| $I_{10}/I_2$ | 9.45 | 7.8–8 |
| PI, kpoise | 11 | 15 |
| Melt Tension | 1.89 | 1.21 |
| Elastic Modulus @ .1 rad/sec. (dyne/cm$^2$) | 2425 | 882.6 |
| OGMF*, critical shear rate (1/sec) | >1556 (not observed) | 936 |
| OGMF*, critical shear stress (MPa) | .452 | .366 |

TABLE III-continued

| Property | Polyolefin Example 5 | Comparison example 7 |
|---|---|---|
| OSMF**, critical shear rate (1/sec.) | >1566 (not observed) | ~628 |
| OSMF**, critical shear stress (MPa) | ~0.452 | ~0.25 |

*Onset of Gross Melt Fracture.
**Onset of Surface Melt Fracture.

Polyolefin Example 6 and Comparison Example 9 have similar melt index and density, but example 6 has lower $I_{10}/I_2$ (Table IV). These polymers are extruded via a Gas Extrusion Rheometer (GER) at 190° C. using a 0.0296 inch diameter, 20:1 L/D die. The processing index (PI) is measured at an apparent shear stress of $2.15 \times 10^6$ dyne/cm$^2$ as described previously.

TABLE IV

| Property | Polyolefin Example 6 | Comparison example 9 |
|---|---|---|
| $I_2$ (g/10 minutes) | 1 | 0.76 |
| $I_{10}/I_2$ | 7.61 | 8.7 |
| PI (kpoise) | 14 | 15 |
| Melt Tension (g) | 1.46 | 1.39 |
| Elastic Modulus @ 0.1 rad/sec (dyne/cm$^2$) | 1481 | 1921 |
| OGMF*, critical shear rate (1/sec) | 1186 | 652 |
| OGMF*, critical shear stress (MPa) | 0.431 | 0.323 |
| OSMF**, critical shear rate (1/sec.) | ~764 | ~402 |
| OSMF**, critical shear stress (MPa) | 0.366 | 0.280 |

*Onset of Gross Melt Fracture.
**Onset of Surface Melt Fracture.

A comparison of the shear stresses and corresponding shear rates before the onset of gross melt fracture is listed in Table IV. The PI of Polyolefin Example 6 is surprisingly about the same as Comparative Example 9, even though the $I_{10}/I_2$ is lower for Polyolefin Example 6. The onset of melt fracture or sharkskin for Polyolefin Example 6 is also at a significantly higher shear stress and shear rate in comparison with the Comparative Example 9. Furthermore, it is also unexpected that the Melt Tension (MT) of Polyolefin Example 6 is higher than that of Comparative Example 9, even though the melt index for Polyolefin Example 6 is slightly higher and the $I_{10}/I_2$ is slightly lower than that of comparative example 9.

The improved properties of the substantially linear polyolefin polymers include improved melt elasticity and processability in thermal forming processes such as extrusion, and injection molding.

Chlorination of Substantially Linear Olefin Polymers

The chlorinated polyethylene resins of this invention are prepared by chlorination of the substantially linear olefin polymers described hereinabove. Chlorination may be accomplished by any known procedure provided in the chlorinated polyethylene prior art literature. In other words, chlorination may be accomplished by suspension, solution, slurry, bulk or fluidized bed, procedures. Suspension chlorination, for example, is disclosed in U.S. Pat. No. 3,454,544, the teachings of which are incorporated herein by reference as if fully set forth. That patent teaches that beneficial results are obtained by introducing gaseous chlorine into an aqueous slurry of the polyolefin, such as polyethylene, resin at a slurry temperature sufficient to attain a desired chemically combined chlorine content. The slurry need only contain the resin and water. A minor amount of talc and a minor amount of surfactant may be added, if desired, as process aids. Following chlorination, the chlorinated resins are simply washed and dried.

As disclosed in the '544 patent, a chlorination procedure which comprehends the suspension chlorination in an inert medium of finely divided substantially linear polyethylene and interpolymers containing at least about 70 mole percent ethylene with the remainder being one or more ethylenically unsaturated comonomers, to a desired total of combined chlorine content, wherein such polymer is first chlorinated at a temperature above its agglomeration temperature for a period sufficient to provide a chlorine content of from about 2 to 23 percent chlorine, based on the total weight of the polymer; followed by the sequential suspension chlorination of such polymer, in a particulate form, at a temperature above its agglomeration temperature but at least about 2° C. below its crystalline melting point for a period sufficient to provide a combined chlorine content of up to about 75 percent, based on the total weight of the polymer.

It has surprisingly been found that chlorination in the first stage to as little as about 2 percent by weight of chlorine advantageously causes the polyolefinic material being chlorinated to lose its crystallinity at a faster rate as the chlorination temperature is increased. A possible explanation for this result is that strain is induced into the polyolefin crystallites by chlorination of the exposed crystallite surfaces at low temperatures, and that the crystallites so chlorinated tend to melt at lower temperatures than non-chlorinated crystallites.

In this regard, introduction of from 2 to less than 10 percent by weight of chlorine during the first stage chlorination is desirable as it allows the formation of chlorinated products having an unexpectedly high degree of flexibility, especially at total chlorine contents below about 35 percent by weight.

The temperature at which the chlorination normally leads to an agglomeration of the polymer depends to a large extent on the nature and the molecular weight of the polyolefin to be chlorinated. In the cases of crystalline and predominantly straight chain polyethylenes having a branching of the chains of less than 1 methyl group per 100 carbon atoms and a density of at least 0.94, i.e. polyethylenes which are predominantly obtained by the low pressure synthesis, the aforesaid temperature is above 95° C., in particular above 100° C., or even above 110° C.

Additionally, it has been found that the sequential chlorination must be conducted at a temperature above that temperature employed for the first chlorination, but below the crystalline melting point of the polyolefin starting material, to provide materials having the combination of desirable properties described herein. In this regard, it has been found that the temperature in such sequential chlorination must necessarily be greater than that employed in the initial chlorination to prevent the retention of excessive undesirable crystallinity with resultant formation of non-uniformly chlorinated polymer; furthermore, if such temperature is above the crystalline melting point of the polymer being chlorinated, particularly when using polymer having a weight average molecular weight, via GPC., of between about 20,000 and 300,000, it has been found that the particle size growth is greatly accelerated with resultant development of undesirable agglomeration of the polymer material. Thus, the temperature employed in the herein described sequential suspension chlorination is that temperature at which a desirable balance between particle growth and destruction of crystallinity is obtained. Such temperature is advantageously individually determined with respect to the polyolefin used, the desired chlorine content, and the desired physical properties of the so-formed chlorinated polymeric material. By way of further explanation, the second-stage temperature falls within a narrow range which is characteristic of the polymer being chlorinated and must be individually determined. It has been found, for example, that this range of second-stage temperatures, for ethylene polymers having a density of at least 0.960 and a specific surface area of less than $2m^2/g$, will fall between 2° and 11° C. below the crystalline melting point for polymers having a molecular weights of about 150,000 to about 300,000, and between about 3° and 13° C. below the crystalline melting point for polymers having molecular weights of between about 20,000 to about 150,000. In addition, if the aforementioned polymers have specific surface areas of greater than about $2m^2/g.$, then these temperatures may fall as much as 3° C. below the ranges indicated. A density of less than about 0.960 may also cause the temperature range to be as much as 3° C. lower than previously indicated.

It has, however, been found to be of special advantage to carry out the chlorination in the presence of inert substances of inorganic or organic chemical nature which are such that they have an affinity for absorption onto the surfaces of the polyolefin during chlorination so that they may function as barriers to inhibit particle agglomeration. In this regard, it has been found that magnesium silicate, while generally showing some tendency toward particle growth inhibition in most of its forms, is surprisingly and unexpectedly effective when used in the form of a platy talc. Finely divided silica, on the other hand, is so inert to the polymer that it is virtually not absorbed at all and is, for all practical purposes, less effective. Exemplary of other useful inert materials are: carbon black and titanium dioxide and the like. Such materials may be employed for the desired purpose without significantly detracting from the highly desirable elastomeric properties of the polymer. As previously indicated, the addition of such fillers serves to inhibit particle growth during chlorination and thus advantageously serves to effectively inhibit the development of undesirable agglomerates. By way of comparison, fillers such as silica, barium sulfate, and other materials which have little if any affinity for absorption onto the polymer being chlorinated are ineffective at reasonable concentrations as particle growth inhibitors in this process. Further, the use of polyvinyl chloride to inhibit agglomeration is also not practical because, if it is used in a concentration high enough to effectively inhibit the particle growth, it will cause stiffening of the flexible materials resulting from this process and loss of resistance to the deleterious effects of heat.

The inert liquid which is employed to suspend the finely divided polymer in the suspension chlorinating procedure of the present invention may be any liquid which is inert to the polymer and is not affected to an appreciable extent by chlorine, or which, while wetting the polymer will not have an appreciable solvent effect on it. While water may be employed with especial advantage as an inert suspending liquid for polyolefins to be chlorinated, the polymer may also be suspended in other inert liquids.

A variety of wetting agents, including sulfonates, sulfates, polyphosphates and other types of ionic and nonionic surfactant materials may be suitably employed, if desired, to assist the inert suspending liquid, particularly when it is water, to wet the polymer. Such materials as sodium lauryl sulfate and alkyl aryl polyether alcohols are illustrative of specific wetting agents that may be utilized. The employment of a wetting agent faciliates the suspension and uniform distribution of the polymer during the chlorination. In some cases, however, it may not be necessary to employ wetting agents, especially when a freshly prepared polymer is employed that is undried after its preparation or when efficient agitation is available for producing and maintaining the polymer slurry.

If it is desired to accelerate the chlorination rate, the reaction may be assisted by the employment of small quantities of catalysts, such as the free-radical types and/or ultra-violet light. When a free-radical catalyst is employed, the rate of reaction which is accomplished through the assistance of the catalyst will depend on such factors as the catalyst concentration, the temperature of the suspending medium in which the catalyst is dissolved, the pH of the solution and the chlorine pressure. Various azotype compounds and peroxides selected from the group of free-radical catalysts consisting of tertiary butyl peroxide; tertiary butyl hydroperoxide; and the like may advantageously be employed. Preferably, when catalyst are employed, such catalyst should be one which has an efficient rate of decomposition in the suspending medium in which it is dissolved in the required temperature range. In this regard, it may be advantageous to employ a mixture of such catalysts, one of which has a temperature of efficient decomposition at or near the optimum initial chlorination temperature, and the other having an efficient decomposition at or near the optimum sequential chlorination temperature. Such catalyst may be added in a single step or continuously depending upon the reaction conditions and catalyst used.

Stabilizers may also be included in the compositions to protect the chlorinated olefin polymer against possible decomposition by the heat of processing or by subsequent exposure of fabricated sheet material to climatic and environmental conditions of use. Suitable stabilizers include those materials conventionally employed in the preparation of vinyl polymer and copolymer sheet compositions, e.g., organic complexes and/or salts of lead, tin, barium, cadmium, zinc, sodium, etc., and particularly the sulfur containing organo tin compounds including the alkyl tin mercaptides as well as dibutyl tin laurate and dibutyl tin maleate and various epoxide compounds such as the epoxidized fatty acids and oils, among others. Stabilizers are preferably used in amounts sufficient to provide between about 1 and 10 parts by weight per 100 parts of the chlorinated olefin polymer constituent. Other conventional additives, such as non-epoxidized fatty acids and oils, and low molecular weight polymers and waxes may also be employed, if desired.

Although the chlorinated olefin polymers employed for the purposes of the present invention are inherently resistant to burning, it may in some instances be advantageous to incorporate minor amounts, i.e., from between about 1 and 10 parts per 100 parts of chlorinated olefin polymer, of one or more flame-retarding agents, e.g., oxides of antimony and/or various halogenated materials such as tetrabromophthalic anhydride, perchloropentacyclodecane, tris (2,3-dibromopropyl) phosphate, tetrabromobisphenol-A, among many others.

Another aspect of this invention is a process for preparing chlorinated polyolefins anhydrously, as described in U.S. Pat. No. 4,425,206, which is incorporated herein by reference as if fully set forth. As disclosed in the '206 patent, an anhydrous free radical process for preparing amorphous chlorinated, solid, finely divided polyethylene particles employs a free radical initiator, a flow of gaseous chlorine and agitation of the particles sufficient to expose generally all of said particles to the flow of gaseous chlorine, the process comprising a series of sequential steps:

(a) starting addition of gaseous chlorine to an agitated mass of porous, finely divided polyethylene particles, the particles being exposed to a free radical initiator, while said mass is at a temperature within a temperature range of from about 25° to about 50° C.;

(b) continuing addition of gaseous chlorine to the agitated mass while continuing to expose the mass to a free radical initiator and while increasing the temperature of said mass over a temperature range of from about 50° C. to about 105° C. and maintaining the temperature within said temperature range until a level of chlorination of the agitated mass of from about 5 to about 15 percent by weight of said mass attained;

(c) continuing addition of gaseous chlorine to the agitated mass while continuing to expose the mass to a free radical initiator and while further increasing the temperature of said mass to a temperature of from about 125° C. to about 132° C., said temperature being increased at a rate which is sufficiently slow to preclude sintering of the agitated mass; and (d) continuing addition of gaseous chlorine to the agitated mass while continuing to expose the mass to a free radical initiator and while further increasing the temperature of said mass to a temperature which is greater than about 130° C. yet less than a temperature at which sintering of the agitated mass occurs and maintaining said temperature for a period of time sufficient to attain a predetermined level of chlorination and a predetermined level of relative crystallinity.

The amorphous chlorinated, solid, finely divided polyethylenes so prepared unexpectedly have very low blocking values. As used herein, the term "blocking" means the tendency of a powdered chlorinated polymer resin to clump, cake or agglomerate. The low blocking values are obtained without addition of conventional antiblock additives.

For purposes of the present invention, the chlorination of such olefin polymer powders may be effected in various ways. It is possible, for example, to agitate the granular polymer by means of stirring devices while exposing it to the action of a current of chlorine, in the substantial absence of oxygen, wherein the chlorine has preferably been preheated. Various apparatus which are equipped with efficient agitating means may be employed to accomplish such agitation and exposure to chlorine. Illustrative apparatus include reactors having paddle agitators or other agitation means, and rotating cylinders which may be provided internal mixing baffles or other agitation means. The apparatus may be vertically or horizontally disposed, or may be inclined from the horizontal to facilitate a continuous internal passage of solid material therethrough during operation. As an alternative, the material may be thoroughly exposed to the halogen atmosphere and effectively agitated by conducting the reaction according to well known fluid bed techniques. When using fluid bed techniques, a current of halogen atmosphere is passed through a finely divided and free-flowing layer (fluidized bed) of the material to be halogenated. The passage or forcing of the halogen atmosphere through the fluidized bed is done at a rate sufficient to accomplish a thorough agitation and exposure of the material being halogenated. Any apparatus in which a free-flowing mass of polymer may be thoroughly subjected to a halogen atmosphere at a desired temperature or over a desired temperature range may be suitably employed for conducting the reaction according to the present invention. Fluorine and vaporized bromine, or mixtures of these may advantageously be used in conjunction with gaseous chlorine to constitute the halogen atmosphere of the present invention. Beneficially the halogen atmosphere of the present invention predominantly comprises gaseous chlorine. In certain instances it may be desirable for the halogen atmosphere to contain inert gases and vapors as diluents or carriers. Inclusion of an inert gas may permit a better control over the reaction. In some instances it may also be advantageous to have only portions of the halogen atmosphere diluted when a continuous process is being employed or to have it diluted only during particular intervals in a batch reaction. In this manner, it is possible in the course of a particular halogenation reaction to adjust reaction conditions to suit the changing reactivity, at various halogen contents, of the olefin polymer powder being halogenated.

Any compatible gas or vapor which, under the reaction conditions, is inert to both the halogen atmosphere and the olefin polymer powder being halogenated may be used as a diluent for the halogen atmosphere. Helium and the inert gases, nitrogen, hydrogen halides; and perchloro, perfluoro, or fluorochloro hydrocarbons are examples of suitable diluents. Recycling of the hydrogen halide formed during the reaction will also provide a suitable means for diluting the halogen atmosphere. It may sometimes be desirable to externally cool the hydrogen halide formed during the reaction when it is being recycled as a diluent. This may furnish an effective means for controlling the temperature of the reaction within a desired range.

The polymer and the halogen atmosphere are beneficially anhydrous, or dry in the physio-chemical sense. If anhydrous conditions are not maintained, any water which is present will be vaporized and converted to steam. The steam will add pressure to the reactor and will contribute to corrosion problems. Accordingly, reactor design and construction would have to be changed if water were present. In addition, initiation of the chlorination reaction, which will be detailed hereinafter, would be altered if water were present.

Temperatures suitable for halogenation of the olefin polymer powder will vary within limits depending upon a variety of factors and conditions. Temperatures will generally be governed by mutual reactivity of the particular olefin polymer powder and halogen atmosphere which are being employed and by the extent of halogenation desired. The reactivity of the halogen atmosphere depends directly on the particular halogen or halogens contained therein and, upon effective concentration of said halogen or halogens. The reactively of the polymer being halogenated is initially fixed by the character of the parent material but may change in the course of a given reaction with a changing halogen content in such polymer. The particle size or shape of the polymer being halogenated may also influence the reaction. Particles having greater surface areas, particularly smaller sized particles or those with crenelated or otherwise irregular configurations, are generally more conducive to a halogenation reaction. The rate of reaction at any given temperature is also largely dependent upon the rate of diffusion of the halogen from the halogen atmosphere into the polymer being halogenated and upon the capacity of the polymer at such temperature to absorb the particular halogen which is involved.

It has been found that amorphous halogenated olefin polymers, specifically amorphous chlorinated polyethylences, are prepared by a process which involves at least four steps. In a first step, using chlorinated polyethylene by way of example, addition of gaseous chlorine to an agitated mass of porous, finely divided polyethylene particles, the particles being in admixture with an initiator, is started while said mass is at a temperature within a temperature range of from about 25° to about 50° C. It has been found that delaying addition of chlorine until the agitated mass of polyethylene particles has been heated to a temperature greater than about 50° C. produces undesirable results. One of the undesirable results is that the polymer particles cannot be maintained in a fluidized or agitated state. Loss of the fluidized state is evidenced by a caking up of the polymer powder. It has been found that little, if any, halogenation actually takes place during the first step. As hereinabove noted, however, the first step is critical. In a second step, addition of gaseous chlorine to the agitated mass is continued while the temperature of said mass is maintained within the temperature range until a level of chlorination of the agitated mass of from about five to about fifteen percent by weight of said mass is attained. It has been found that, with a level of chlorination of less than about five percent by weight, the agitated mass of polyethylene particles tends to agglomerate as chlorination at higher temperatures is attempted. It has also been found that with a level of chlorination of greater than about fifteen percent by weight of said mass in the second step, an undesirably stiff chlorinated polyethylene product results once chlorination is completed. A nominal melting point for linear high density polyethylene is 130° C. It has been found that as the polymer is chlorinated, the melting point decreases to a minimum of about 106° C. at a level of chlorination of about 12 percent by weight of chlorinated polymer. As the level of chlorination is increased above about 12 percent by weight of chlorinated polymer, the melting point begins to increase above the minimum. As one exceeds the melting point, sufficient melting of at least surface portions of polymer particles occurs to cause the polymer particles to begin to agglomerate. As a maximum level of chlorination of about fifteen percent by weight of the agitated mass occurs during the second step, should not exceed about 105° C. In a third step, addition of gaseous chlorine to the agitated mass is continued while the temperature of said mass is further increased to a temperature of from about 125° C. to about 132° C. The temperature of said mass is increased at a particular rate which is sufficiently fast to be economical yet sufficiently slow to generally retain a porous particulate structure and to generally prevent sintering of the partially chlorinated polyethylene particles. It has been found that a rate of heating which is too rapid generally results in a chlorinated polyethylene product which is not amorphous after chlorination is terminated. The term "amorphous" as used herein describes a chlorinated polymer having a percent relative crystallinity suitably less than about two percent, beneficially less than about 0.5 percent, desirably less than about 0.3 percent. A rate of heating which is too rapid may also result in agglomeration of the partially chlorinated polyethylene particles. An agglomerated or sintered mass of partially chlorinated polyethylene particles is of no practical use. In light of the foregoing, a suitable rate of heating is from about 0.15° to about 0.36° C. per minute. Beneficially, the rate of heating is from about 0.20° to about 0.36° C. per minute. Desirably, the rate of heating is from 0.25° to about 0.32° C. per minute. In a fourth step, chlorination of the polyethylene particles is completed. Addition of gaseous chlorine to the agitated mass is continued while the temperature of said mass is further increased to a temperature greater than about 130° C. but less than a temperature at which the particles begin to agglomerate. The temperature must be sufficiently high to produce an amorphous polymer as defined herein by destroying generally all residual crystallinity. The temperature must also be sufficiently low to preclude formation of large lumps or agglomerates of particles. The presence of agglomeration renders a product generally unsuitable for commercial use. It has been found that temperature of up to about 145° C. may be used for the fourth step without detriment. Persons skilled in the art will recognize that temperatures sufficiently in excess of 145° C. will cause the particles to coalesce into one or more lumps.

Although the rate of halogenation increases with temperature, care should be taken to avoid higher temperatures which may sinter, fuse or char the polymer. When this occurs it becomes more difficult to keep the finely divided polymer in a proper state of agitation and it may cause non-uniformity in the product. In addition, the halogenation reaction is seriously impeded with a sintered polymer because exposed particle surface area is markedly reduced by sintering.

The halogenation reaction of the present invention may be conducted under any suitable pressure. Beneficially, it is carried out at atmospheric pressure. The reaction may, however, be carried out at superatmospheric pressure in order to hasten the rate of reaction. Satisfactory results may also be obtained when the reaction is being conducted under atmospheric pressure by employing a halogen atmosphere which contains amounts of the halogen in excess of stoichiometric requirements. When the reaction is conducted under superatmospheric pressure, care should be exercised to adequately vent by-product materials which are formed in order to maintain an effective halogen level in the halogen atmosphere.

The halogenation reaction of the present invention may be carried out in the presence of a free radical initiator. The free radical initiator is suitably selected from the group consisting of chemical free radical forming initiators, free radical forming radiation and a combination of free radical forming radiation and one or more chemical free radical forming initiators.

Free radical forming radiation must have a wavelength sufficient to activate the halogen. In general, suitable results are obtained by employing ultraviolet radiation having a wavelength in the range from about 3,000 to about 4,500 Angstroms (A). Beneficial results have been obtained by using ultraviolet radiation having a wavelength of from about 3,350 to about 3,650 A.

Suitable chemical free radical forming initiators are: peroxides and hydroperoxides, for instance benzoyl-peroxide, diisopropylperoxide, lauroylperoxide, and the like, azo compounds in particular those with a nitrile group at a carbon atom which is adjacent to an azonitrogen atom, like dimethyl and diethyl, $\alpha,\alpha'$-azobis($\alpha,\epsilon$-dimethylvaleronitrile). Other known initiators can be used in the process according to the invention.

Still another aspect of this invention is a solution process for preparing chlorinated polyolefins, as described in U.S. Pat. No. 3,110,709, which is incorporated herein by reference as if fully set forth. In this process, polyethylene is dissolved in a solvent such as carbon tetrachloride at a temperature above the normal boiling point of the solvent and a superatmospheric pressure sufficient to maintain the solvent in a liquid phase, e.g. 80°–120° C. and 5–100 psig. Elemental chlorine is then passed through the solution until a partially chlorinated product, usually containing about 15 weight percent chlorine is obtained. This intermediate product is soluble in carbon tetrachloride at atmospheric pressure and temperatures up to the boiling point of carbon tetrachloride. The temperature is then lowered to 50°–70° C. and the pressure is lowered to atmospheric and the chlorination is continued to be desired extent. The solvent can be removed by volatilization and the chlorinated polymer recovered as a residue or, an antisolvent e.g. methanol, can be added to precipitate the chlorinated polymer which can be recovered by filtration. 1,1,2,2-tetrachloroethane may also be used as the solvent in the solution process.

Halogen levels of from about 20 to about 50 percent by weight of halogenated polymer may be obtained in accordance with the present invention. Beneficially amorphous chlorinated polyethylenes having a chlorine content, based on chlorinated polymer weight, of from about 25 to about 45 weight percent are obtained. Desirably such chlorinated polyethylenes have a chlorine content of from about 30 to about 42 weight percent. Persons skilled in the art will recognize that chlorinated polyethylene having a chlorine content of 60 weight percent or more will tend to be a glassy material rather than a rubbery material.

Also of interest as an aspect of this invention is a chlorosulfonated polyolefin, such as described in U.S. Pat. No. 4,584,351, which is incorporated herein by reference as if fully set forth. As disclosed in the '351 patent, the chlorinated polyolefin, such as chlorinated polyethylene, starting materials are treated with a gaseous mixture of sulfur dioxide and chlorine to substitute sulfonyl chloride groups on the polymer. This treatment is suitably carried out at a temperature of from about 20° to about 100° C. by passing the gaseous mixture through the chlorinated polyethylene particles, as in a fluidized bed reactor, in the presence of a chlorine free-radical generator.

The temperature at which the starting materials are treated is beneficially within a temperature range of from about 20° to about 80° C. The temperature is desirably within a temperature range of from about 20° to about 50° C. The temperature is preferably within a temperature range of from about 20° to about 45° C. A temperature from about 25° to 35° C. is particularly preferred. It has been found that, with all other reaction parameters being equal, lower reaction temperatures are more conducive to increased rates of sulfonation than higher reaction temperatures.

The gaseous mixture has a ratio of sulfur dioxide to chlorine which is suitably from about 1:1 to about 8:1, and preferably from about 1:1 to about 4:1. It has been found that at ratios of from about 1:1 to about 8:1, rates of sulfonation are greater than they are for ratios greater than 8:1. Ratios as great as 32:1 and even higher can be used if desired. They are counter-productive, however, because the rate of sulfonation is greater at lower ratios. Ratios of less than about 1:1 may be used but they are undesirable because they favor chlorination over sulfonation.

If an accelerated rate of chlorosulfonation is desired, the reaction may be assisted by the employment of ultraviolet light and/or small quantities of a chlorine free-radical generating catalyst. The ultraviolet has a wavelength suitable for generating chlorine free-radicals. Ultraviolet light alone is generally sufficient to produce satisfactory results.

A catalyst, where used, must have certain characteristics in order to be suitable for purposes of the present invention. First, it must be capable of contacting or being intimately admixed with the chlorinated polyethylene starting materials. Second, it must be active over at least a portion of the temperature range used for treating the starting material with the gaseous mixture. Third, it must be sufficiently active to allow reasonable amounts thereof to be used. Various azo-type compounds and peroxides, such as tertiary butyl peroxide and the like, are suitable free radical catalyst.

Preparation of chlorosulfonated polyethylene materials is accomplished within a time period which is beneficially from about 15 to 120, desirably from about 15 to about 70 and preferably from about 15 to about 35 minutes. A time period of less than about 15 minutes is not sufficient to attain the desired sulfur content. A time period of greater than 120 minutes may be used. It is, however, neither necessary nor economical.

The chlorosulfonated polyethylene produced in accordance with the present invention has a chlorine content which is beneficially from about 20 to about 50, preferably from about 25 to about 42 percent by weight of polymer. The chlorosulfonated polyethylene prepared in accordance with the present invention has a sulfur content which is beneficially from about 0.8 to about 2.5, desirably from about 0.9 to about 1.4 and preferably from about 1.0 to about 1.2 percent by weight of polymer.

The chlorosulfonated polyethylene prepared in accordance with the present invention has a weight average molecular weight which is beneficially from about 40,000 to about 300,000, desirably from about 90,000 to about 250,000 and preferably from about 120,000 to 180,000. When compositions of the invention contain a vulcanizing package, the package may include magnesium oxide for toxicological reasons, and optionally, one or more sulphur-containing accelerators such as mercaptobenzothiazole, benzothiazyl disulphide or dipentamethylene thiuram tetrasulphide. Magnesium oxide, when used, is present in an amount of from about 3 to about 7 parts by weight. Sulphur-containing accelerators are generally used in amounts of from about 0.5 up to about 3 parts by weight. All parts by weight are based on 100 parts by weight of polymer. Other vulcanizing packages known by those skilled in the art to be suitable for vulcanizing chlorosulfonated polyethylene may also be used.

Alternatively, U.S. Pat. No. 3,296,222, teaches process for continuously chlorosulfonating by rapidly and homogeneously mixing $Cl_2+SO_2$ with an inert volatile solvent solution, of polyethylene at 85°–105° C. and under a pressure sufficient to maintain all components in the liquid phase, passing the mixture to a reactor—before more than one fifth of the $Cl_2$ has reacted during mixing—at 90°–250° C. and under the stated pressure, and arresting the reaction at above 140° C. before all the $Cl_2$ has reacted by passing to a chamber of lower pressure in which the unreacted $Cl_2$ and $SO_2$ are evaporated.

The compositions of the invention may also contain fillers, such as carbon black, mineral fillers or carbon black-mineral filler mixtures, various processing aids and antioxidants. Illustrative fillers other than carbon black include titanium dioxide, barium sulfate, kaolin clay, diatomaceous earth, powdered talc and calcium sulfate. Suitable processing aids may include the well known plasticizers and softeners such as low molecular weight polyethylenes, the aromatic hydrocarbon oils and the like. Antioxidants may be readily selected from among those well known in the art.

Additional antiagglomeration additives can be employed with the chlorinated chlorosulfonated polymers as desired. For example, according to U.S. Pat. Nos. 4,263,200; 4,481,333; or 4,562,224, each of which is incorporated by reference herein as if fully set forth, various inorganic compounds including aluminum oxide produced by a pyrogenic process, silanized silicium dioxide, silanized and calcined aluminum silicate, silanized kaolin can be added to a process in which a polyolefin is chlorinated in water or HCl suspension. Further, finely divided fluoropolymers have been added to the chlorination liquor along with certain types of silica. Still further, chlorination carried out in the pressure of a dispersing system of poly-N-vinylpyrrolidone and hydrophobic silicic acid can be accomplished to reduce tendency of the chlorinated polyethylene to agglomerate. More particularly, the chlorination in suspension of water or hydrochloric acid can be carried out in the presence of small amounts of silicic acid and silicone oil to produce chlorinated polyethylenes.

The present invention is now illustrated by, but is by no means limited to, the following examples. Ethylene-1-octene copolymer materials, having the properties listed in Table V below, were mechanically ground, at room temperature, to provide resin particles in the 250 μm area. These powdered materials were then chlorinated in aqueous suspension using the chlorination program shown in Table VI. The temperatures used for the chlorination program were based on the melting point of the polymers, $T_m$. The starting temperature of stage one was chosen to be approximately 33° C. below $T_m$, and the final lineout temperature was chosen to be $(T_m-3°)\pm3°$ C.

Then 10 lbs (4.5kg) of polyethylene resin were heated in a reactor provided with an agitator containing 100 lbs (45.36 kg) of water and a surfactant up to the targeted stage one starting temperature. At this temperature the chlorination program was started and proceeded to follow the program given in Table VI. At the end of the chlorination program, the chlorinated polyethylene was washed to remove residual chlorine and hydrochloric acid and then dried in a fluid bed drier. Chlorinated polyethylene materials using polyethylene resins produced using Ziegler-Natta catalyst were made to serve as control materials. These are also included in Table V. The particle size of these polyethylene resins was of the order of 100–150 μm.

chlorinated polyethylene products, such as Tyrin® CM0136 and Tyrin® 3615P, made from feedstocks H and J, respectively, are included. Results are given in Table VII below.

TABLE VII

Chlorinated Resin Properties

| Example | Wt. % Cl | $\Delta H_f$ (cal/g) |
|---|---|---|
| A | 35.0 | 0.20 |
| B | 36.7 | 0.21 |
| C | 37.0 | 0.25 |
| D | 35.0 | 0.31 |
| E | 34.1 | 0.31 |
| F | 34.6 | 0.31 |
| G1 | 35.3 | 1.30 |
| G2 | 30.1 | 0.71 |
| H1 | 32.0 | 6.60 |
| H2 | 37.1 | 0.46 |
| I | 35.6 | 0.21 |
| Tyrin ® 0136 | 36.0 | 0.10 |
| Tyrin ® 3615P | 36.0 | 0.10 |

The chlorinated products were then evaluated in a) thermoplastic compositions, b) crosslinked or elastomeric compositions using peroxide and thiadiazole curing systems and c) as impact modifiers in rigid PVC compositions. The formulations used are given in Tables VII, IX, and X and the

TABLE V

Feedstocks Used in Chlorination

| Example | Density (g/cm³) | $I_2$ (g/10 min) | $I_{10}/I_2$ | $\Delta H_f$ (cal/g) | $T_m$ (°C.) | Mz (g/mol) | Mw (g/mol) | Mn (g/mol) | Mw/Mn |
|---|---|---|---|---|---|---|---|---|---|
| A | 0.953 | 0.72 | 13.5 | 33.91 | 127.5 | 133,900 | 72,200 | 32,700 | 2.21 |
| B | 0.952 | 0.67 | 9.17 | 33.12 | 128.3 | 157,600 | 85,600 | 40,400 | 2.12 |
| C | 0.935 | 2.31 | 11.1 | 36.07 | 120.0 | 116,700 | 60,800 | 25,900 | 2.35 |
| D | 0.935 | 2.36 | 9.50 | 29.03 | 120.7 | 114,000 | 63,800 | 29,300 | 2.18 |
| E | 0.904 | 0.91 | 10.5 | 11.17 | 101.8 | 151,300 | 76,900 | 32,700 | 2.35 |
| F | 0.904 | 0.87 | 9.29 | 15.08 | 102.3 | 149,900 | 80,600 | 38,000 | 2.12 |
| G | 0.903 | 0.8 | 8.7 | | | | | | |
| H | 0.965 | 0.4 | | 48.63 | 127.6 | 1,502,000 | 215,000 | 17,300 | 12.4 |
| I | 0.965 | 1.0 | | 48.76 | 125.4 | 1,120,000 | 157,000 | 12,100 | 13.0 |
| J | 0.965 | 0.2 | | 42.77 | 125.4 | 1,645,000 | 221,000 | 20,100 | 11.0 |

TABLE VI

Chlorination Program for 36 wt. % Cl Products

| | Cl Program Procedure | | | Cl Program for Example B | | |
|---|---|---|---|---|---|---|
| Stage No. | Stage Starting Temp. (°C.) | Stage Ending Temp. (°C.) | Cumulative Wt. % Cl₂ | Stage No. | Stage Starting Temp. (°C.) | Stage Ending Temp. (°C.) | Cumulative Wt. % Cl₂ |
| 1 | $T_m - 33°$ | $T_m - 18°$ | 5.6 | 1 | 95 | 110 | 5.6 |
| 2 | $T_m - 18°$ | $T_m - 11°$ | 14.9 | 2 | 110 | 117 | 14.9 |
| 3 | $T_m - 11°$ | $T_m - 3°$ | 24.5 | 3 | 117 | 128 | 24.5 |
| 4 | $T_m - 3°$ | $T_m - 3°$ | 36 | 4 | 128 | 128 | 36 |

NOTE:
Temperature of Stage 4 is $(T_m - 3°) \pm 3°$
Wt. % Cl Target is 36% ± 1.5%, $\Delta H_f$ target is 0.5 val/g max.

The resultant chlorinated products were analyzed for weight percent chlorine and weight percent ash via thermogravimetric analysis, (TGA), and for residual polyethylene crystallinity via differential scanning calorimetry, (DSC) per ASTM D 3418. Also, for comparative purposes commercial properties in Tables XI, XII, XIII, XIV, and XV.

Physical properties were measured from modulus blankets prepared on a two roll mill heated to 177° C. (350° F.) according to the formulation listed in Table VIII. Test specimens were die cut from plaques that were compression molded from the blankets. Molding was done between Teflon® sheets and ferroplates at 190° C. and with 14 MPa of pressure(20 tons on 5" ram). A 6"×10"×0.060" (15.24 cm×25.4 cm×0.1524 cm) spacer plate was used to obtain plaques of the same nominal thickness. Molding times were 3 minute preheat, 3 minutes at pressure, and 3 minutes between ambient water cooled platens at 14 MPa of pressure. Tensile properties were performed in accordance to ASTM D 412 using microtensile specimens described in ASTM D 1708. Capillary theology was performed using a 40/1 L/D die at 190° C.(374° F.). The shear rate range was from $3.5s^{-1}$ to $350s^{-1}$. Cut strips from compression molded plaques were allowed a preheat of 5 minutes prior to being extruded through the capillary die. Dynamic mechanical analysis (DMA) was done on 2"(5.08 cm) diameter disks die cut from compression molded plaques according to ASTM D 4440. Viscosity information was obtained from DMA run in plate-plate mode. The viscosity results from DMA were merged with capillary data using the Cox-Merz rule. Plots of shear stress ($\tau$) versus shear rate ($\gamma$), and apparent viscosity ($\eta_a$) versus shear rate ($\gamma$) were constructed and fitted to a power law regression of the form:

$$\tau = k\gamma^n$$

$$\eta_a = k\gamma^{(n-1)}$$

Where n is the shear thinning exponent and k is a constant.

The chlorinated polyolefins were also evaluated in elastomer formulations and as an impact modifier for PVC. In the case of elastomers, the chlorinated products were used in both peroxide and thiadiazole cured formulations. Table IX gives the details for the basic elastomer formulations. The elastomer formulations in Table IX were mixed in a Fartel BR Banbury® at low speeds, dropped out of the Banbury® at 121° C.(250° F.). Mixing continued for five passes on a cold two roll mill, after which a blanket was sheeted off and allowed to cool at ambient lab conditions. Prior to physical testing the formulated sheets were tested for Mooney viscosity using ASTM D 1646, and for degree of cure via oscillating disk rheometry (ODR) as per ASTM D 2084. Mooney viscosity gives information on processing and scorch time. The Mooney viscosimeter was run at 121° C.(250° F.), using the small rotor, a one minute preheat, and for a duration of 25 minutes or until there was a 5 Mooney unit viscosity rise from the minimum viscosity. Reported values are minimum viscosity, time to a 3 unit rise in viscosity, and time to a 5 minute rise. ODR was done at 204° C.(400° F.) for 12 minutes for peroxide cured formulations, and 177° C.(350° F.) for 12 minutes for thiadiazole cured formulations. Reported results are the maximum torque value, the change or Δ torque and $T_{90}$ the time to 90% of cure. For physical property testing, compression molded plaques were pressed out in a preheated slab mold at 9.7 MPa (1400psi} for a duration time of whatever the $T_{90}$ value was for the compound. Peroxide cured formulations were pressed at 204° C.(400° F.), while the thiadiazole cured formulations were pressed at 177° C.(350° F.). Tensile tests were performed using standard dumbbells as specified by ASTM D 412. DMA was done according to the methods specified for the modulus blankets. The tear strengths of the cured formulations were measured according to ASTM D 624 using the type C test specimen. Air oven aging was performed according to ASTM D 573. Compression set was performed at 100° C.(212° F.) for 22 hours using ASTM D 395.

The formulation used for PVC impact modification is given in Table XI. Formulations were mixed in a twin rotor Haake Torque Rheometer heated at 180° C.(356° F.), with a rotor speed of 60rpm, until 10 totalized torque. The mixed formulation was then removed from the rotor and pressed between ferroplates at 200° C.(392° F.) for 2 minutes at 14 MPa (20 tons on a 5"(12.7 cm)ram) using a 4"×6"×0.125"(10.1×15.2×0.318 cm) spacer plate. This was followed by a 5 minute cooling period between ambient water cooled platens under 14 MPa of pressure. The Izod test was performed in accordance with ASTM D 256 Method A, and was performed at 23° C.(74° F.). Capillary theology was also performed on the formulations to determine if differences might be observed in the melt processing of these formulations. The procedure for capillary theology was the same as that given above. Table VII shows the basic product properties for the chlorinated resins.

Surprisingly, the physical properties of the modulus blanket formulated chlorinated metallocene polymer products compare very favorably to CPE made from Ziegler-Natta catalyst polyethylene. This is true despite the fact that Mw for the metallocene based polymer feedstocks are close to one-half that of the Example I feedstock, and almost a third of the Mw of the Example H feedstock. These results for the modulus blankets are summarized in Table XI. From Table V, Examples A and B have Mws of 72,200 and 85,600 g/mol respectively, while Example I has a Mw of 157,000 g/mol, or approximately 2.2 times the Mw of Example A and 1.8 that of Example B. However, The 100% modulus values for Examples A and B (0.81 and 1.01MPa) are greater than that for Example I (0.74MPa), and the ultimate tensile of Example B (10.5 MPa) exceeds that of Example I (9.21 MPa). The 100% and 200% modulus values of Examples E and F compare favorably to those of Examples H1, and Tyrin® CM0136 and Tyrin® 3615P despite significantly lower values of Mw for the starting feedstocks for E and F. Indeed Examples E and F showed extraordinary performances as their microtensile specimens were able to be stretched to the limit of the tensile test frame (in excess of 2350%) without breaking.

Formulated Properties

Similar trends are seen on crosslinked elastomer formulations that were observed in the modulus blanket formulations. Physical properties for the chlorinated polyethylenes of this invention were equivalent or better than CPE made from Ziegler-Natta feedstocks of two or three times the Mw of the substantially linear polyethylene feedstocks. This can be observed from a review of the Tables XI through XIV. As mentioned previously, the Mw of Example I is approximately 1.5 times greater than that of Example A, yet Example A exhibits significantly higher Δtorque, modulii, tensile and tear strength than Example I, with only a slight increase in Mooney minimum viscosity. From Table XII the Mooney minimum viscosity and ultimate tensile strength for Example A are 19 Mooney units and 12.3 MPa respectively, while for Example I it is 15 Mooney units and 11.3 MPa. Examples C and D which were made from even lower Mw substantially linear polyethylene feedstocks have comparable mechanical properties and Mooney minimum viscosities to Example I. Examples A, B, E, and F, whose feedstocks' Mw ranged from 72,200 to 85,600 compare very favorably to Examples H1, H2 and Tyrin® CM0136, products made from a nominal 215,000 feedstock. In fact from Table XII, Example E has 100% and 200% modulus values in excess of both Examples H2 and Tyrin® CM0136, while having a Mooney viscosity of about 60% that of Tyrin®] CM0136. Indeed, the high Δtorque values achieved by the chlorinated polyethylenes of this invention are indicative of very efficient crosslink networks, most likely brought about by the absence of lower molecular weight fractions due to the narrow molecular weight distributions of the substantially linear polyethylene feedstocks. The good cure efficiencies of the chlorinated polyethylenes of this invention mean that less curative can be used to achieve comparable physical properties to standard Ziegler-Natta feedstock CPEs.

As was the case for the modulus blanket and elastomer formulations, chlorinated polyethylenes of this invention in PVC impact modification formulations performed as well or better than CPEs based on Ziegler-Natta feedstocks of higher molecular weight. From Table XV, Example A has an Izod impact energy of 277 J/m, while Example I has an impact energy of 256 J/m, and Tyrin® 3615P, a 221,000 g/mol Mw, has an impact energy of 246 J/m. Also, better impact performance was achieved from those chlorinated polyethylenes of this invention whose feedstocks contained lower levels of long chain branching. The PVC formulation containing Example C, made from a 11.1 $I_{10}/I_2$ feedstock, had an Izod impact energy of 224 J/m, while the PVC formulation with Example D, a 9.50 $I_{10}/I_2$ feedstock, had an impact energy of 240 J/m.

Compared to unstearated chlorinated polyethylenes, that is Example H1 and I, the rheological performance of PVC modified with chlorinated polyethylenes of this invention are as good or better than with those CPEs made from Ziegler-Natta feedstocks. Example A has a k value of 491,000 poise quite comparable to the values of 520,000 poise and 448,000 poise for Examples H1 and I. Example C has a k value of 261,000 poise which coupled with its Izod impact energy of 240 J/m, demonstrates that an unstearated chlorinated polyethylene of this invention can produce a polyvinyl chloride formulation with equivalent impact properties at much lower viscosities than a stearated Ziegler-Natta catalyzed polyethylene, such as Tyrin® 3615P. Lower viscosity formulations permit faster processing rates on siding and window profile extrusion lines. Also, the viscosity of the chlorinated polyethylenes of this invention made from feedstocks with long chain branching exhibit lower viscosities as is seen by the power law prefactor k. Example C made from a 11.1 $I_{10}/I_2$ feedstock has a k value 261,000 poise, while for Example D, 9.50 $I_{10}/I_2$ feedstock, has a k value of 497,000 poise. Thus, PVC formulations can be designed for processing of impact performance by changing the level of long chain branching in the feedstock material.

TABLE VIII

| Modulus Blanket Formulation | | | |
|---|---|---|---|
| Ingredient | PHR | Wt. % | Grams |
| CPE | 100 | 91.75 | 300 |
| Calcium Stearate | 2 | 1.83 | 6 |
| Epoxidized Soybean Oil | 3 | 2.75 | 9 |
| Stearic Acid | 0.5 | 0.46 | 1.5 |
| Irganox ® 1035 | 1.5 | 1.38 | 4.5 |
| Testrasodium Pyrophosphate | 2.0 | 1.83 | 6 |
| TOTAL | 109 | 100 | 327 |

TABLE IX

| | Elastomeric Formulations | | | | | |
|---|---|---|---|---|---|---|
| | Formula 1 | | Formula 2 | | Formula 3 | |
| Ingredient | PHR | Wt. % | PHR | Wt. % | PHR | Wt. % |
| Chlorinated Polyethylene | 100 | 39.06 | 100 | 33.11 | 100 | 39.53 |
| IRGANOX 1035 | 1 | 0.39 | | | 1 | 0.40 |
| $CaCO_3$ | 50 | 19.53 | 25 | 8.28 | 50 | 19.76 |
| N 550 Carbon Black | 50 | 19.53 | 38 | 12.58 | 50 | 19.76 |
| Catalpo Clay | | | 77 | 25.50 | | |
| Trioctyl Trimellitate | 40 | 15.63 | | | 40 | 15.81 |
| Paraffin Wax | | | 2 | 0.66 | | |
| Di-iso-nonyl phthalate (DINP) | | | 43 | 14.24 | | |
| MgO | 5 | 1.95 | | | 5 | 1.98 |
| $Mg(OH)_2$ | | | 4 | 1.32 | | |
| Stearic Acid | | | 2 | 0.66 | | |
| Vulkup ® 40 KE (α-αbis(t-butylperoxy) diisopropylbenzene) | 5 | 1.95 | 5 | 1.66 | | |
| Saret ® 517 | 5 | 1.95 | 4 | 1.32 | | |
| (Acrylic Coagent) WB-212 | | | 2 | 0.66 | | |
| Echo ® A (thiadiazole derivative) | | | | | 4 | 1.58 |
| Tetrabutyl Ammonium Bromide | | | | | 3 | 1.19 |
| TOTAL | 256 | 100 | 302 | 100 | 253 | 100 |

TABLE X

| PVC Impact Modification Formulation | | |
|---|---|---|
| Ingredient | PHR | Wt. % |
| Polyvinyl Chloride | 100 | 82.30 |
| T 137 | 1.5 | 1.23 |
| Calcium Stearate | 1 | 0.82 |
| XL 165 | 1 | 0.82 |
| K 120 N | 1 | 0.82 |
| $TiO_2$ | 2 | 1.65 |
| $CaCO_3$ | 10 | 8.23 |

TABLE X-continued

| PVC Impact Modification Formulation | | |
|---|---|---|
| Ingredient | PHR | Wt. % |
| Chlorinated Polyethylene | 5 | 4.12 |
| TOTAL | 121.5 | 100 |

TABLE XI

Modulus Blanket Properties

| | Tensile Properties | | | | Capillary Rheology | |
|---|---|---|---|---|---|---|
| | 100% | 200% | Ultimate | % | | |
| Example | Modulus (MPa) | Modulus (MPa) | Tensile (MPa) | Elongation at Break | k (Poise) | n |
| A | 0.81 | 0.61 | 8.66 | 2182 | 227,000 | 0.482 |
| B | 1.01 | 0.90 | 10.5 | 1683 | 555,000 | 0.409 |
| C | 0.71 | 0.54 | 3.40 | 2277 | 163,000 | 0.524 |
| D | 0.80 | 0.59 | 4.25 | 2359 | 219,000 | 0.490 |
| E | 1.14 | 1.14 | No Break | No Break | 197,000 | 0.456 |
| F | 1.44 | 1.47 | No Break | No Break | 238,000 | 0.499 |
| G1 | 0.84 | 0.85 | 6.40 | 1355 | 383,000 | 0.414 |
| G2 | 0.75 | 0.70 | 5.58 | 1915 | 385,000 | 0.405 |
| H1 | 1.86 | 2.31 | 11.98 | 1177 | 257,000 | 0.452 |
| H2 | 0.86 | 0.83 | 9.12 | 1682 | 467,000 | 0.393 |
| I | 0.74 | 0.72 | 9.21 | 1479 | 246,000 | 0.446 |
| Tyrin ® 3615P | 1.48 | 1.80 | 11.02 | 904 | | |
| Tyrin ® CM0136 | 1.30 | 1.48 | 10.00 | 988 | | |

TABLE XII

Properties of Formulation 1

| | Mooney Viscosity @ 121° C. | | | ODR @ 204° C. | | | Tensile Properties | | | | | |
|---|---|---|---|---|---|---|---|---|---|---|---|---|
| | | | | Max. | Δ | | 100% | 200% | Ultimate | % | Tear | 100° C. |
| Example | Minimum Viscosity | Δ3 (min.) | Δ5 (min.) | Torque (N-m) | Torque (N-m) | T$_{90}$ (min.) | Modulus (MPa) | Modulus (MPa) | Tensile (MPa) | Elongation at Break | Strength (kN/m) | Compression Set (%) |
| A | 19 | >25 | >25 | 7.12 | 6.59 | 1.7 | 3.81 | 7.14 | 12.3 | 405 | 35.9 | 23 |
| B | 31 | >25 | >25 | 8.96 | 8.01 | 1.7 | 4.44 | 8.49 | 14.3 | 394 | 37.5 | 17 |
| C | 13 | >25 | >25 | 5.60 | 5.34 | 1.8 | 3.63 | 6.67 | 11.1 | 398 | 35.2 | 29 |
| D | 14 | >25 | >25 | 5.86 | 5.58 | 1.8 | 3.63 | 6.70 | 10.9 | 378 | 35.0 | 37 |
| H1 | 23 | >25 | >25 | 7.06 | 6.38 | 1.7 | 5.47 | 8.63 | 11.7 | 326 | 35.9 | 20 |
| I | 15 | >25 | >25 | 5.29 | 4.86 | 1.9 | 3.30 | 6.47 | 11.3 | 415 | 33.4 | 21 |
| Tyrin ® CM0136 | 28 | >25 | >25 | 6.65 | 6.65 | 1.7 | 4.46 | 8.38 | 13.5 | 388 | 37.5 | 16 |

TABLE XIII

Properties of Formulation 2

| | Mooney Viscosity @ 121° C. | | | ODR @ 204° C. | | | Tensile Properties | | | |
|---|---|---|---|---|---|---|---|---|---|---|
| | | | | Max. | Δ | | 100% | 200% | Ultimate | % |
| Example | Minimum Viscosity | Δ3 (min.) | Δ5 (min.) | Torque (N-m) | Torque (N-m) | T$_{90}$ (min.) | Modulus (MPa) | Modulus (MPa) | Tensile (MPa) | Elongation at Break |
| A | 14 | >25 | >25 | 5.90 | 5.54 | 1.5 | 3.02 | 4.76 | 9.74 | 449 |

TABLE XIII-continued

Properties of Formulation 2

| | Mooney Viscosity @ 121° C. | | | ODR @ 204° C. | | | Tensile Properties | | | |
|---|---|---|---|---|---|---|---|---|---|---|
| Example | Minimum Viscosity | $\Delta 3$ (min.) | $\Delta 5$ (min.) | Max. Torque (N-m) | Torque (N-m) | $T_{90}$ (min.) | 100% Modulus (MPa) | 200% Modulus (MPa) | Ultimate Tensile (MPa) | % Elongation at Break |
| B | 20 | >25 | >25 | 6.65 | 6.07 | 1.5 | 3.14 | 5.11 | 10.6 | 433 |
| C | 9.5 | >25 | >25 | 4.36 | 4.18 | 1.5 | 2.72 | 4.18 | 7.56 | 451 |
| D | 12 | >25 | >25 | 5.46 | 5.23 | 1.4 | 2.86 | 4.45 | 8.78 | 450 |
| E | 11 | >25 | >25 | 5.16 | 4.88 | 1.5 | 3.16 | 4.79 | 8.80 | 430 |
| F | 14 | >25 | >25 | 5.98 | 5.67 | 1.5 | 3.50 | 5.32 | 9.05 | 403 |
| H2 | 14 | >25 | >25 | 5.71 | 5.22 | 1.6 | 2.69 | 4.63 | 10.24 | 436 |
| I | 9.6 | >25 | >25 | 4.20 | 3.93 | 1.5 | 2.14 | 3.52 | 8.63 | 494 |
| Tyrin ® CM0136 | 18 | >25 | >25 | 5.67 | 5.08 | 1.5 | 2.74 | 4.56 | 10.30 | 449 |

TABLE XIV

Properties of Formulation 3

| | Mooney Viscosity @ 121° C. | | | ODR @ 177° C. | | | Tensile Properties | | | | | |
|---|---|---|---|---|---|---|---|---|---|---|---|---|
| Example | Minimum Viscosity | $\Delta 3$ (min.) | $\Delta 5$ (min.) | Max. Torque (N-m) | Torque (N-m) | $T_{90}$ (min.) | 100% Modulus (MPa) | 200% Modulus (MPa) | Ultimate Tensile (MPa) | % Elongation at Break | Tear Strength (kN/m) | 100° C. Compression Set (%) |
| A | 23 | 6.5 | 7.8 | 7.74 | 7.07 | 7.2 | 5.92 | 9.95 | 11.3 | 247 | 29.8 | 20 |
| B | 34 | 5.5 | 6.4 | 8.67 | 7.59 | 6.6 | 6.27 | 10.7 | 12.5 | 258 | 31.3 | 18 |
| C | 16 | 6.5 | 8.2 | 8.86 | 8.49 | 5.3 | 5.90 | 9.87 | 11.7 | 256 | 30.8 | 22 |
| D | 17 | 6.8 | 8.7 | 8.25 | 7.82 | 6.2 | 5.68 | 9.52 | 11.5 | 272 | 31.5 | 19 |
| H1 | 27 | 4.8 | 6.0 | 5.81 | 5.14 | 6.0 | 6.05 | | 8.80 | 196 | 29.6 | 24 |
| I | 17 | 6.0 | 8.1 | 6.44 | 5.95 | 6.2 | 4.94 | 8.23 | 9.99 | 272 | 29.8 | 18 |
| Tyrin ® CM0136 | 31 | 4.8 | 5.5 | 7.84 | 6.71 | 5.7 | 6.07 | 10.5 | 13.2 | 283 | 34.1 | 15 |

TABLE XV

Room Temperature Izod Impact Performance of PVC Modified Blends

| Example | Impact Energy (J/m) | Std. Deviation (J/m) | k (Poise) | n |
|---|---|---|---|---|
| A | 277 | 37.4 | 486,000 | 0.424 |
| B | 342 | 148 | 503,000 | 0.442 |
| C | 224 | 1.6 | 261,000 | 0.464 |
| D | 240 | 1.6 | 497,000 | 0.395 |
| H1 | 224 | 1.1 | 520,000 | 0.354 |
| I | 256 | 108 | 448,000 | 0.396 |
| Tyrin ® 3615P | 246 | 113 | 383,000 | 0.429 |

The following abbreviations, tradenames and trademarks have been employed in this application and are identified by general chemical composition and manufacture.

| Tradename | Chemical Composition | Manufacturer/ Distributor |
|---|---|---|
| AC 617 | Polyethylene Wax | Allied Signal Chemical |
| Attane ® 4803 | Linear Ultra Low Density Polyethylene | The Dow Chemical Co. |
| CaSt | Calcium Stearate | C. P. Hall |
| Catalpo Clay | Aluminum Silicate | Engelhard |
| Drapex ® 6.8 | Epoxidized Soybean Oil | Ashland Chemical |
| Echo ® A | Dimercapto Thiadiazole Derivative | Hercules |
| HDPE | High Density Polyethylene | The Dow Chemical Co. |
| Hostalube ® XL 165 | Parrafin Wax | Hoescht |
| Irganox ® 1035 | Thiodiethylene bis(3,5 di-tert-butyl-4-hydroxyhydrocinnamate) | Ciba-Geigy |
| Jayflex ® | Di-iso-nonyl Phthalate | Exxon |

| Tradename | Chemical Composition | Manufacturer/Distributor |
|---|---|---|
| MB 4232 TBAB | Tetrabutyl Ammonium Bromide Masterbatch on CPE | Harwick |
| N-550 | Carbon | Cabot |
| Omyacarb ® UF | Calcium Carbonate | Omya |
| Paraloid ® K 120N | Ethyl Methyl Acrylate Polymer | Rohm Haas |
| Saret ® 517 | Acrylic Coagent | Sartomer |
| Stearic Acid | Stearic Acid | C. P. Hall |
| Stan mag ® AG | Magnesium Oxide | Harwick |
| Stan mag ® Hydroxide B | Magnesium Hydroxide | Harwick |
| Struktol ® WB-212 | Animal Fat | Struktol |
| T 137 | Organotin Mercaptide | Atochem |
| $TiO_2$ | Titantium Dioxide | DuPont |
| TOTM | Trioctyl Trimellitate | C. P. Hall |
| TSPP | Tetrasodium Pyrophosphate | Zeeland Chemical Co. |
| TYRIN | Chlorinated Polyethylene | The Dow Chemical Co. |
| VULKUP 40 KE | α-α-bis-(t-butylperoxy)di-isopropylbenzene | Hercules |

What we claim is:

1. Chlorinated polyolefin comprising the product produced by chlorinating a substantially linear olefin polymer characterized as having:

a) a melt flow ratio, $I_{10}/I_2$, $\geq 5.63$, b) a molecular weight distribution, Mw/Mn, defined by the equation: $Mw/Mn \leq (I_{10}/I_2) - 4.63$, and c) a critical shear rate at onset of surface melt fracture of at least 50 percent greater than the critical shear rate at the onset of surface melt fracture of a linear olefin polymer having about the same $I_2$ and Mw/Mn.

2. The chlorinated polyolefin of claim 1 wherein the Mw/Mn of the substantially linear olefin polymer is less than about 3.5.

3. The chlorinated polyolefin of claim 1 wherein the Mw/Mn of the substantially linear olefin polymer is from about 1.5 to about 2.5.

4. The chlorinated polyolefin of claim 1 wherein the chlorine content is from about 10 to about 48% by weight.

5. The chlorinated polyolefin of claim 1 wherein the 100% tensile modulus ranges from about 0.2 to about 2.0 MPa and is comparable to the 100% tensile modulus of materials produced from chlorinating Ziegler-Natta catalyzed polyethylene having substantially twice the weight average molecular weight.

6. The chlorinated polyolefin of claim 1 wherein the substantially linear olefin polymer comprises an interpolymer of ethylene and a $C_3$–$C_{20}$ alpha-olefin.

7. The chlorinated polyolefin of claim 6 wherein the Mw/Mn of the substantially linear olefin interpolymer is less than about 3.5.

8. The chlorinated polyolefin of claim 6 wherein the Mw/Mn of the substantially linear olefin interpolymer is from about 1.5 to about 2.5.

9. The chlorinated polyolefin of claim 6 wherein the chlorine content is from about 10 to about 48% by weight.

10. The chlorinated polyolefin of claim 6 wherein the 100% tensile modulus ranges from about 0.2 to about 2.0 MPa and is comparable to the 100% tensile modulus of materials produced from chlorinating Ziegler-Natta catalyzed polyethylene having substantially twice the weight average molecular weight.

11. The chlorinated polyolefin of claim 1 wherein the substantially linear olefin polymer is characterized as having from about 0.01 to about 3 long chain branches per 1000 carbon atoms along the polymer backbone.

12. The chlorinated polyolefin of claim 11 wherein the Mw/Mn of the substantially linear olefin polymer is less than about 3.5.

13. The chlorinated polyolefin of claim 11 wherein the Mw/Mn of the substantially linear olefin polymer is from about 1.5 to about 2.5.

14. The chlorinated polyolefin of claim 11 wherein the chlorine content is from about 10 to about 48% by weight.

15. The chlorinated polyolefin of claim 1 wherein the substantially linear olefin polymer is characterized as having from about 0.01 to about 1 long chain branches per 1000 carbon atoms.

16. The chlorinated polyolefin of claim 15 wherein the Mw/Mn of the substantially linear olefin polymer is less than about 3.5.

17. The chlorinated polyolefin of claim 15 wherein the Mw/Mn of the substantially linear olefin polymer is from about 1.5 to about 2.5.

18. The chlorinated polyolefin of claim 15 wherein the chlorine content is from about 10 to about 48% by weight.

19. The chlorinated polyolefin of claim 1 wherein the substantially linear olefin polymer is characterized as having from about 0.3 to about 1 long chain branches per 1000 carbon atoms.

20. The chlorinated polyolefin of claim 19 wherein the Mw/Mn of the substantially linear olefin polymer is less than about 3.5.

21. The chlorinated polyolefin of claim 19 wherein the Mw/Mn of the substantially linear olefin polymer is from about 1.5 to about 2.5.

22. The chlorinated polyolefin of claim 19 wherein the chlorine content is from about 10 to about 48% by weight.

23. The chlorinated polyolefin of claim 1 wherein said process is carried out in an aqueous suspension of said substantially linear olefin polymer.

24. The chlorinated polyolefin of claim 1 wherein said process is carried out in a solution of said substantially linear olefin polymer in a halogenated hydrocarbon solvent capable of dissolving the substantially linear olefin polymer.

* * * * *